US012746635B2

(12) United States Patent
Ishikawa et al.

(10) Patent No.: US 12,746,635 B2
(45) Date of Patent: Sep. 29, 2026

(54) POWER TOOL WITH OPERATION ASSEMBLY

(71) Applicant: MAKITA CORPORATION, Anjo (JP)

(72) Inventors: Junya Ishikawa, Anjo (JP); Ryosuke Otani, Anjo (JP); Daiki Imaida, Anjo (JP); Fumiyoshi Saito, Anjo (JP); Shinichi Honma, Anjo (JP)

(73) Assignee: MAKITA CORPORATION, Anjo (JP)

(*) Notice: Subject to any disclaimer, the term of this patent is extended or adjusted under 35 U.S.C. 154(b) by 854 days.

(21) Appl. No.: 17/912,697

(22) PCT Filed: Apr. 6, 2021

(86) PCT No.: PCT/JP2021/014673
§ 371 (c)(1),
(2) Date: Sep. 19, 2022

(87) PCT Pub. No.: WO2021/206101
PCT Pub. Date: Oct. 14, 2021

(65) Prior Publication Data

US 2023/0158630 A1 May 25, 2023

(30) Foreign Application Priority Data

Apr. 10, 2020 (JP) ................................ 2020-071244

(51) Int. Cl.
*B24B 23/02* (2006.01)
*B24B 49/10* (2006.01)
(Continued)

(52) U.S. Cl.
CPC ............ *B24B 23/022* (2013.01); *B24B 49/10* (2013.01); *B24B 55/052* (2013.01); *B25F 5/026* (2013.01)

(58) Field of Classification Search
CPC ......... B24F 1/02; B25B 21/00; B25B 21/007; B25B 21/008; B25B 21/02; B25B 21/026;
(Continued)

(56) References Cited

U.S. PATENT DOCUMENTS 5,974,611 A 11/1999 Casella
8,087,977 B2 * 1/2012 Gallagher ............ B24B 55/102 451/359

(Continued)

FOREIGN PATENT DOCUMENTS

CN 108367409 A 8/2018
JP S51-114787 U 9/1976

(Continued)

OTHER PUBLICATIONS

Jun. 8, 2021 International Search Report issued in International Patent Application No. PCT/JP2021/014893.

(Continued)

*Primary Examiner* — Brian D Keller
*Assistant Examiner* — Aaron R McConnell
(74) *Attorney, Agent, or Firm* — Oliff PLC

(57) ABSTRACT

A tool includes a prime mover, switch, operation member for the switch, first accessory, second accessory, third intermediate member moved in conjunction with displacement of the operation member, first intermediate member configured to be displaced from a first blocking position of blocking a displacement route of the third intermediate member to a first non-blocking position of not blocking the displacement route by attachment of the first accessory, and second intermediate member configured to be displaced from a second blocking position of blocking the displacement route to a second non-blocking position of not blocking the displacement route by attachment of the second accessory. Only when the first intermediate member is located at the (Continued)

first non-blocking position and the second intermediate member is located at the second non-blocking position, the third intermediate member is permitted to be displaced so that the operation member is permitted to be displaced to the ON position.

21 Claims, 21 Drawing Sheets

(51) Int. Cl.
*B24B 55/05* (2006.01)
*B25F 5/02* (2006.01)

(58) Field of Classification Search
CPC ............ B25B 23/0007; B25B 23/0021; B25B 23/0042; B25B 23/0078; B25B 23/0085; B25B 23/14; B25B 23/147; B25B 23/16
See application file for complete search history.

(56) References Cited

U.S. PATENT DOCUMENTS

| | | | |
|---|---|---|---|
| 12,194,596 B2 | 1/2025 | Mizutani et al. | |
| 2002/0100597 A1* | 8/2002 | Numata | B24B 23/028 173/217 |
| 2005/0161241 A1 | 7/2005 | Frauhammer et al. | |
| 2011/0114345 A1 | 5/2011 | Schlesak et al. | |
| 2014/0231113 A1 | 8/2014 | Steurer | |
| 2017/0348843 A1* | 12/2017 | Barth | B24B 23/028 |
| 2018/0272494 A1 | 9/2018 | Schadow et al. | |
| 2018/0281146 A1 | 10/2018 | Tomonaga et al. | |
| 2018/0326554 A1 | 11/2018 | Schadow et al. | |
| 2020/0055159 A1 | 2/2020 | Sakai et al. | |
| 2023/0119351 A1 | 4/2023 | Sugiura et al. | |
| 2023/0158630 A1 | 5/2023 | Ishikawa et al. | |

FOREIGN PATENT DOCUMENTS

| | | |
|---|---|---|
| JP | S58-055847 U | 4/1983 |
| JP | H10-510210 A | 10/1998 |
| JP | 2012-061541 A | 3/2012 |
| JP | 2013-233637 A | 11/2013 |
| WO | 2017/051892 A1 | 3/2017 |
| WO | 2017/051893 A1 | 3/2017 |
| WO | 2018/180083 A1 | 10/2018 |
| WO | 2020/054631 A1 | 3/2020 |

OTHER PUBLICATIONS

Oct. 6, 2022 International Preliminary Report on Patentability issued in International Patent Application No. PCT/JP2021/014893.
Jan. 24, 2025 Office Action issued in U.S. Appl. No. 17/914,880.
Dec. 20, 2024 Office Action issued in Chinese Patent Application No. 202180026069.X.
Jan. 1, 2025 Office Action issued in Chinese Patent Application No. 202180026601.8.
Jun. 8, 2021 International Search Report issued in International Patent Application No. PCT/JP2021/014673.
Oct. 6, 2022 International Preliminary Report on Patentability issued in International Patent Application No. PCT/JP2021/014673.
Jul. 23, 2025 Office Action issued in Chinese Patent Application No. 202180026601.8.

* cited by examiner

POWER TOOL WITH OPERATION ASSEMBLY

TECHNICAL FIELD

The present invention relates to a tool including a prime mover.

BACKGROUND

Various kinds of accessories may be detachably attached to tools including a prime mover. For example, in the case of a grinder including a tool accessory configured to be rotationally driven, examples of detachably attachable accessories prepared therefor include a cover used to cover a part of the tool accessory (also referred to as a wheel cover, a disk cover, a blade case, or the like), and a side handle to be held by the other hand of a user when the user holds a handle of the grinder with one of his/her hands.

For such a grinder, there is a demand for preventing the grinder from being used in a state that the accessory is not attached. For example, the following patent literature, PTL 1 discloses a grinder including a sensor that detects whether or not a cover is attached and a controller that prohibits a rotation of a tool accessory when the cover is not attached. Further, the following patent literature, PTL 2 discloses a grinder including a sensor that detects whether or not a cover is attached and a sensor that detects whether or not a side handle is attached.

CITATION LIST

[PTL 1] International Publication No. 2017-051893
[PTL 2] US Patent Application Publication No. 2018/272494

SUMMARY

Technical Problem

However, the techniques discussed in PTLs 1 and 2 may be unable to detect the attachment of the cover or the side handle when a failure has occurred in the sensor or when the sensitivity of the sensor reduces due to deposition of dust. Further, the configuration that prohibits the rotation of the tool accessory unless both the cover and the side handle are attached raises the necessity of providing a sensor individually separately for each of the cover and the side handle, thereby leading to a cost increase. Such problems are not limited to the grinder, and lie in common for any tool including a prime mover and configured to allow two types of accessories to be detachably attached thereto. Under these circumstances, a configuration that allows the prime mover to be driven only when the two types of accessories are attached is desired to be realized without using a sensor for the tool.

Solution to Problem

The present specification discloses a tool. This tool may include a prime mover, a switch for driving the prime mover, an operation member configured to be displaceable between an OFF position of bringing the switch into an OFF state and an ON position of bringing the switch into an ON state, a first accessory, a second accessory, a first attachment portion configured to allow the first accessory to be detachably attached thereto, a second attachment portion configured to allow the second accessory to be detachably attached thereto, a first intermediate member configured to be displaced by the attachment of the first accessory to the first attachment portion, a second intermediate member configured to be displaced by the attachment of the second accessory to the second attachment portion, and a third intermediate member configured to be displaced along a displacement route between an OFF corresponding position corresponding to the OFF position and an ON corresponding position corresponding to the ON position in conjunction with the displacement of the operation member. The first intermediate member may be located at a first blocking position of blocking the displacement route of the third intermediate member in a state that the first accessory is not attached to the first attachment portion, and be located at a first non-blocking position of not blocking the displacement route of the third intermediate member in a state that the first accessory is attached to the first attachment portion. The second intermediate member may be located at a second blocking position of blocking the displacement route of the third intermediate member in a state that the second accessory is not attached to the second attachment portion, and be located at a second non-blocking position of not blocking the displacement route of the third intermediate member in a state that the second accessory is attached to the second attachment portion. When the first intermediate member is located at the first non-blocking position and the second intermediate member is located at the second non-blocking position, the third intermediate member may be permitted to be displaced from the OFF corresponding position to the ON corresponding position so that the operation member is permitted to be displaced from the OFF position to the ON position. When at least the first intermediate member is located at the first blocking position or at least the second intermediate member is located at the second blocking position, the third intermediate member may be prohibited from being displaced from the OFF corresponding position to the ON corresponding position by at least one of the first intermediate member and the second intermediate member so that the operation member is prohibited from being displaced from the OFF position to the ON position.

According to this tool, in the state that at least one of the first accessory and the second accessory is not attached, at least one of the first intermediate member and the second intermediate member blocks the displacement route of the third intermediate member, by which the operation member is prohibited from being displaced from the OFF position to the ON position. On the other hand, in the state that the first accessory is attached to the first attachment portion and the second accessory is attached to the second attachment portion, the first intermediate member and the second intermediate member are displaced to the positions of not blocking the displacement route of the third intermediate member, by which the operation member is permitted to be displaced from the OFF position to the ON position. Therefore, a configuration that allows the prime mover to be driven only when both the first accessory and the second accessory are attached can be realized using only a mechanical structure without using a sensor.

DESCRIPTION OF EMBODIMENTS

Figure 1:
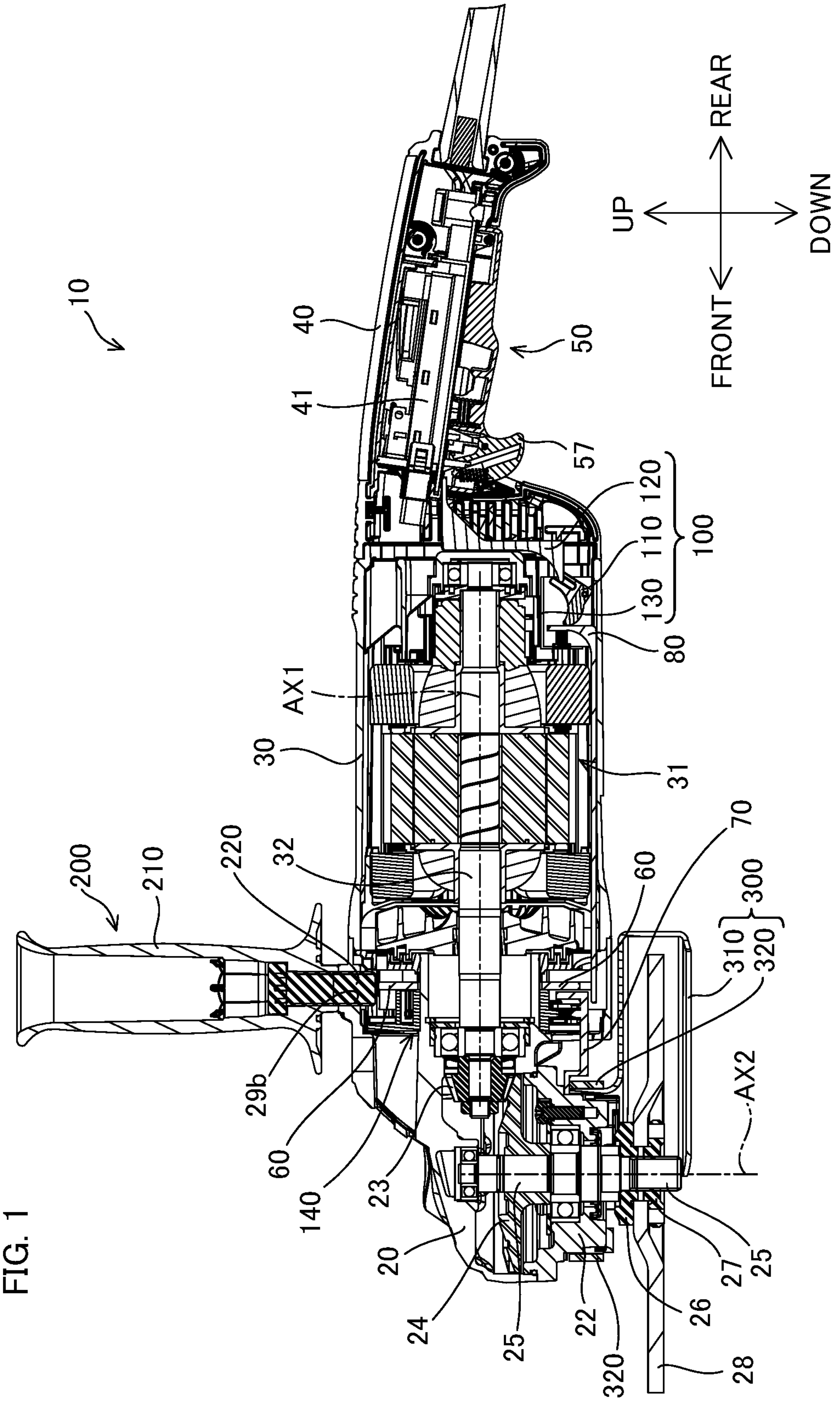
FIG. 1 is a vertical cross-sectional view of a grinder according to a first embodiment of the present invention, and illustrates a state that a side grip and a wheel cover are attached thereto and an operation member is located at an ON position.

In one or more embodiment(s), a tool may include a prime mover, a switch for driving the prime mover, an operation member configured to be displaceable between an OFF position of bringing the switch into an OFF state and an ON position of bringing the switch into an ON state, a first accessory, a second accessory, a first attachment portion configured to allow the first accessory to be detachably attached thereto, a second attachment portion configured to allow the second accessory to be detachably attached thereto, a first intermediate member configured to be displaced by the attachment of the first accessory to the first attachment portion, a second intermediate member configured to be displaced by the attachment of the second accessory to the second attachment portion, and a third intermediate member configured to be displaced along a displacement route between an OFF corresponding position corresponding to the OFF position and an ON corresponding position corresponding to the ON position in conjunction with the displacement of the operation member. The first intermediate member may be located at a first blocking position of blocking the displacement route of the third intermediate member in a state that the first accessory is not attached to the first attachment portion, and be located at a first non-blocking position of not blocking the displacement route of the third intermediate member in a state that the first accessory is attached to the first attachment portion. The second intermediate member may be located at a second blocking position of blocking the displacement route of the third intermediate member in a state that the second accessory is not attached to the second attachment portion, and be located at a second non-blocking position of not blocking the displacement route of the third intermediate member in a state that the second accessory is attached to the second attachment portion. When the first intermediate member is located at the first non-blocking position and the second intermediate member is located at the second non-blocking position, the third intermediate member may be permitted to be displaced from the OFF corresponding position to the ON corresponding position so that the operation member is permitted to be displaced from the OFF position to the ON position. When at least the first intermediate member is located at the first blocking position or at least the second intermediate member is located at the second blocking position, the third intermediate member may be prohibited from being displaced from the OFF corresponding position to the ON corresponding position by at least one of the first intermediate member and the second intermediate member so that the operation member is prohibited from being displaced from the OFF position to the ON position.

According to this tool, in the state that at least one of the first accessory and the second accessory is not attached, at least one of the first intermediate member and the second intermediate member blocks the displacement route of the third intermediate member, by which the operation member is prohibited from being displaced from the OFF position to the ON position. On the other hand, in the state that the first accessory is attached to the first attachment portion and the second accessory is attached to the second attachment portion, the first intermediate member and the second intermediate member are displaced to the positions of not blocking the displacement route of the third intermediate member, by which the operation member is permitted to be displaced from the OFF position to the ON position. Therefore, a configuration that allows the prime mover to be driven only when both the first accessory and the second accessory are attached can be realized using only a mechanical structure without using a sensor.

In one or more embodiment(s), the prime mover may be an electric motor. The tool may be a grinder including a tool accessory configured to be rotated by the electric motor. The first accessory may be a side grip. The second accessory may be a cover that partially covers the tool accessory. According to this configuration, the grinder that allows the electric motor to be driven only when both the side grip and the cover are attached can be realized without using a sensor.

In one or more embodiment(s), the first attachment portion may include at least two side grip attachment portions for selectively attaching the side grip. The first intermediate member may be a single member provided in common for the at least two side grip attachment portions. The first intermediate member may include at least one pressed portion configured to, when the side grip is attached to one side grip attachment portion arbitrarily selected from the at least two side grip attachment portions, be directly or indirectly pressed by the side grip, and the first intermediate member may be configured to be displaced when the at least one pressed portion is pressed. According to this configuration, the single first intermediate member is used in common for the at least two side grip attachment portions, and therefore the number of components can be reduced.

In one or more embodiment(s), the first intermediate member may include a first intermediate member main body having an annular shape or a partially annular shape. The at least two side grip attachment portions may be located at positions spaced apart from each other in a circumferential direction of the annular shape or the partially annular shape, respectively. According to this configuration, the first intermediate member is shaped to correspond to the layout of the at least two side grip attachment portions, and therefore the single first intermediate member can be used in common for the at least two side grip attachment portions with a simple structure.

In one or more embodiment(s), the first intermediate member may be configured to be rotated about a rotational axis when the at least one pressed portion is pressed. According to this configuration, in the case where the at least two side grip attachment portions are located at the positions spaced apart from each other in the circumferential direction of the annular shape or the partially annular shape, respectively, the first intermediate member can be easily displaced regardless of which is selected from the at least to side grip attachment portions to attach the first accessory. Further, this configuration eliminates the necessity of securing a space for the displacement of the first intermediate member in a direction in which the rotational axis extends, thereby allowing the tool to have a compact size in the direction in which the rotational axis extends.

In one or more embodiment(s), the at least one pressed portion may protrude radially outward from the first intermediate member main body. The at least one pressed portion may be provided at at least two positions respectively corresponding to positions of the at least two side grip attachment portions, respectively. According to this configuration, the first intermediate member can be easily rotated.

In one or more embodiment(s), the first intermediate member may include a blocking portion that blocks the displacement route of the third intermediate member when the first intermediate member is located at the first blocking position. The blocking portion may protrude radially outward from the first intermediate member main body. According to this configuration, the third intermediate member can be disposed near the outer edge of the tool to avoid the positions where main components of the tool are arranged.

In one or more embodiment(s), the first intermediate member main body may include a first through-hole having a circular-arc shape centered at the rotational axis. The first intermediate member may be attached rotatably along the circular-arc shape using a screw via the first through-hole. According to this configuration, the first intermediate member can be held rotatably with a simple structure.

In one or more embodiment(s), the at least one pressed portion may include a pressed surface angled with respect to a longitudinal direction of the side grip in such a manner that the first intermediate member is displaced in a direction different from the longitudinal direction of this side grip. The longitudinal direction of the side grip is a longitudinal direction of the side grip when the side grip is attached to the one side grip attachment portion. According to this configuration, the first intermediate member can be easily rotated.

In one or more embodiment(s), the second intermediate member may be configured to be linearly moved by being directly or indirectly pressed by the cover when the cover is attached to the second attachment portion. According to this configuration, the tool does not have to include a direction conversion mechanism by being designed in such a manner that the attachment direction of the cover matches a linear motion direction of the second intermediate member, thereby allowing the second intermediate member to be displaced with a simple structure.

In one or more embodiment(s), the second intermediate member may include a second through-hole in the form of an elongated hole having a longitudinal direction extending along a direction in which the second intermediate member is linearly moved. The second intermediate member may be attached linearly movably along the elongated hole using a screw via the second through-hole. According to this configuration, the second intermediate member can be held linearly movably with a simple structure.

In one or more embodiment(s), a rotational axis of the electric motor and a rotational axis of the tool accessory may intersect with each other.

In one or more embodiment(s), the first attachment portion and the second attachment portion may be disposed on a first side in a longitudinal direction of the tool. The operation member may be disposed on a second side opposite from the first side. The third intermediate member may be an elongate member extending in the longitudinal direction. According to this configuration, even in the case where the first attachment portion and the second attachment portion, and the operation member are arranged at positions relatively distant from each other, the above-described various embodiments of the present invention can be easily realized.

In one or more embodiment(s), the tool may further include a single holding member that holds the first intermediate member and the second intermediate member. According to this configuration, mounting each of the first intermediate member and the second intermediate member to the holding member automatically determines the relative positions of the first intermediate member and the second intermediate member. In other words, the relative positions of the first intermediate member and the second intermediate member do not have to be adjusted when the tool is assembled.

In one or more embodiment(s), a first displacement direction, which is a displacement direction of the operation member, and a second displacement direction, which is a displacement direction of the third intermediate member, may be different from each other. The tool may include a conversion mechanism configured to convert a motion of the operation member in the first displacement direction into a motion of the third intermediate member in the second displacement direction. According to this configuration, the displacement direction of the operation member is free of design constraints, and thus an optimum type of operation member can be employed according to the specifications of the tool.

In one or more embodiment(s), the tool may be a grinder. The grinder may include a handle housing configured to be held by a user, and a motor housing containing the electric motor therein. The handle housing may be located on an opposite side of the motor housing from the tool accessory in a direction in which the rotational axis of the electric motor extends. The above-described various embodiments can be easily applied to such a grinder.

In one or more embodiment(s), a tool may include a switch for driving a prime mover, an operation member configured to be displaceable in a first direction between an OFF position of bringing the switch into an OFF state and an ON position of bringing the switch into an ON state, an attachment portion configured to allow an accessory to be detachably attached thereto, a lock-off portion configured to switch a status of the operation member between a lock-off state, in which the operation member is prohibited from being displaced from the OFF position to the ON position, and a lock-off released state, in which the operation member is permitted to be displaced from the OFF position to the ON position, according to a change in an engagement state with the operation member, and a first intermediate member configured to be displaced by being directly or indirectly pressed by the accessory when the accessory is attached to the attachment portion. The first intermediate member may be located at a prohibition position of prohibiting a release operation for switching the lock-off state to the lock-off released state with the aid of abutment between members in a state that the accessory is not attached to the attachment portion, and be located at a permission position of permitting the release operation due to absence of the abutment between members in a state that the accessory is attached to the attachment portion.

According to this tool, the configuration that allows the prime mover to be driven only when the accessory is attached can be realized using only a mechanical structure without using a sensor. Further, normally, the operation of releasing the lock-off is accompanied by a displacement of a component easily recognizable to a user. Therefore, when the prime mover cannot be driven despite the fact that the user performs the operation of displacing the operation member from the OFF position to the ON position, the user can easily notice that the reason therefor is not a failure in the switch but because the accessory is not attached.

In one or more embodiment(s), the lock-off portion may be a fixed engagement structure. The operation member may be configured to be displaceable in a second direction different from the first direction from a lock-off position corresponding to the lock-off state to a lock-off released position corresponding to the lock-off released state. The release operation may include displacing the operation member from the lock-off position to the lock-off released position.

In one or more embodiment(s), the tool may further include a second intermediate member configured to be moved in conjunction with the displacement of the operation member in the second direction between a first corresponding position corresponding to the lock-off position of the operation member and a second corresponding position corresponding to the lock-off released position of the operation member. The first intermediate member may be configured to be displaced so as to block a displacement route of the second intermediate member from the first corresponding position to the second corresponding position when being located at the prohibition position, and so as not to block the displacement route of the second intermediate member from the first corresponding position to the second corresponding position when being located at the permission position. According to this configuration, the first intermediate member and the operation member may be disposed separately, and therefore the design flexibility of the tool is improved.

In the following description, embodiments of the present invention will be described in further detail with reference to the drawings. In the embodiments that will be described below, a handheld-type electric disk grinder (hereinafter simply referred to as a grinder) 10 will be cited as an example of a tool including a prime mover.

Figure 2:
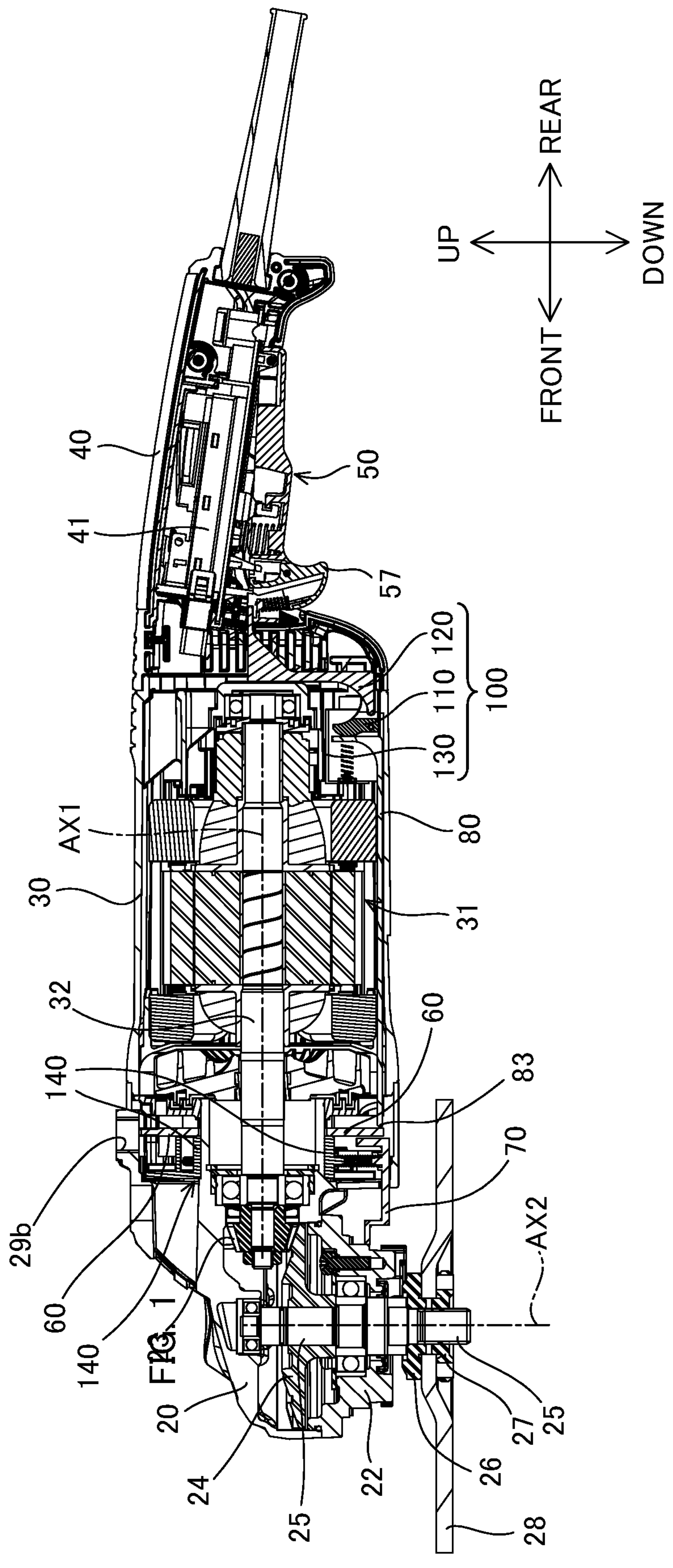
FIG. 2 is a vertical cross-sectional view of the grinder, and illustrates a state that the side grip and the wheel cover are detached therefrom and the operation member is located at an OFF position.

As illustrated in FIGS. 1 and 2, the grinder 10 is configured to rotationally drive a generally disk-like tool accessory 28 mounted around a spindle 25. The spindle 25 is rotated by a rotational driving force provided from an electric motor 31 as the prime mover. A grinding stone, a rubber pad, a brush, a blade, and the like are prepared as the tool accessory 28 mountable to the grinder 10. A user selects the appropriate tool accessory 28 according to desired processing work and mounts it to the grinder 10. According to the grinder 10, processing work such as grinding, polishing, and cutting can be performed on a processing target material according to the type of the tool accessory 28.

In the following description, a direction in which a rotational axis AX1 of the electric motor 31 (i.e., a motor shaft 32) extends is defined to be a front-rear direction of the grinder 10. One side in the front-rear direction on which the tool accessory 28 is located is defined to be a front side, and the opposite side therefrom is defined to be a rear side. Further, a direction in which a rotational axis AX2 of the spindle 25 (i.e., a rotational axis of the tool accessory 28) extends is defined to be a vertical direction of the grinder 10. One side in the vertical direction on which the tool accessory 28 is located is defined to be a lower side, and the opposite side therefrom is defined to be an upper side. Further, a direction perpendicular to the vertical direction and the front-rear direction is defined to be a left-right direction of the grinder 10. A right side in the left-right direction when the front side is viewed from the rear side is defined to be a right side of the grinder 10, and the opposite side therefrom is defined to be a left side of the grinder 10.

As illustrated in FIGS. 1 and 2, the grinder 10 includes a gear housing 20, a motor housing 30, and a handle housing 40. The electric motor 31 is contained in the motor housing 30, which is located between the gear housing 20 and the handle housing 40 in the front-rear direction, i.e., the longitudinal direction of the grinder 10. The electric motor 31 is configured to be driven by electric power supplied from outside (alternating-current power in the present embodiment, but may be direct-current power).

A mechanism for transmitting the rotational driving force of the electric motor 31 to the tool accessory 28 is contained in the gear housing 20. More specifically, a small bevel gear 23, a large bevel gear 24, and the spindle 25 are contained in the gear housing 20. The small bevel gear 23 is fixed around the motor shaft 32 at the front end portion of the motor shaft 32 of the electric motor 31. The spindle 25 is supported rotatably about the rotational axis AX2 by bearings disposed so as to be vertically spaced apart from each other. The rotational axis AX2 intersects with (more specifically, intersects perpendicularly to) the rotational axis AX1 of the electric motor 31. The large bevel gear 24 is fixed around the spindle 25 on the upper side of the spindle 25, and is meshed with the small bevel gear 23. The gear housing 20 includes a second attachment portion 22 at the lower edge portion thereof. The second attachment portion 22 is used to detachably attach a cover 300. The second attachment portion 22 has a vertically extending hollow circular cylindrical shape. The spindle 25 extends vertically in the gear housing 20, and extends out of the gear housing 20 (more specifically, the second attachment portion 22) on the lower side.

An inner flange 26 is attached around the spindle 25 at the lower end portion of the spindle 25 extending out of the gear housing 20. A male screw portion is formed on a lower portion of the spindle 25 with respect to the inner flange 26, and a lock nut 27 is attached to this male screw portion. The position of the tool accessory 28 relative to the spindle 25 is fixed by interposing the tool accessory 28 between the inner flange 26 and the lock nut 27 and tightening the lock nut 27.

The handle housing 40 is a portion to be held by the user with one of his/her hands when the grinder 10 is in use. The handle housing 40 has a hollow circular cylindrical shape extending generally in the front-rear direction. A switch 41 for driving the electric motor 31 is contained inside the handle housing 40. An operation member 50 is provided under the handle housing 40. The operation member 50 is configured to be displaceable between an OFF position of bringing the switch 41 into an OFF state (refer to FIG. 2) and an ON position of bringing the switch 41 into an ON state (refer to FIG. 1).

When the electric motor 31 is driven by the user operating the operation member 50 from the OFF position to the ON position, the rotation of the motor shaft 32 is transmitted to the spindle 25 while being slowed down via the small bevel gear 23 and the large bevel gear 24. At this time, the direction of the rotational motion is converted from the direction around the motor shaft 32 into the direction around the rotational axis AX2 of the spindle 25. According to this mechanism, the spindle 25 is rotated about the rotational axis AX2 in response to the rotation of the motor shaft 32, and the tool accessory 28 fixed by the inner flange 26 and the lock nut 27 is rotated together with the spindle 25 as a result thereof.

As illustrated in FIG. 1, the grinder 10 further includes a side handle 200 and the cover 300 as accessories thereof. The side handle 200 is prepared to be held by the user with the opposite hand from his/her hand holding the handle housing 40. The user can further stably hold the grinder 10 by using the side handle 200. The side handle 200 includes a grip portion 210 to be held by the user, and an attachment portion 220 to be attached to the gear housing 20. The attachment portion 220 has a circular columnar shape extending in the longitudinal direction of the side handle 200, and extends out of one end of the grip portion 210 in the longitudinal direction of the side handle 200. A male screw is formed on the outer peripheral surface of the attachment portion 220.

Figure 14:
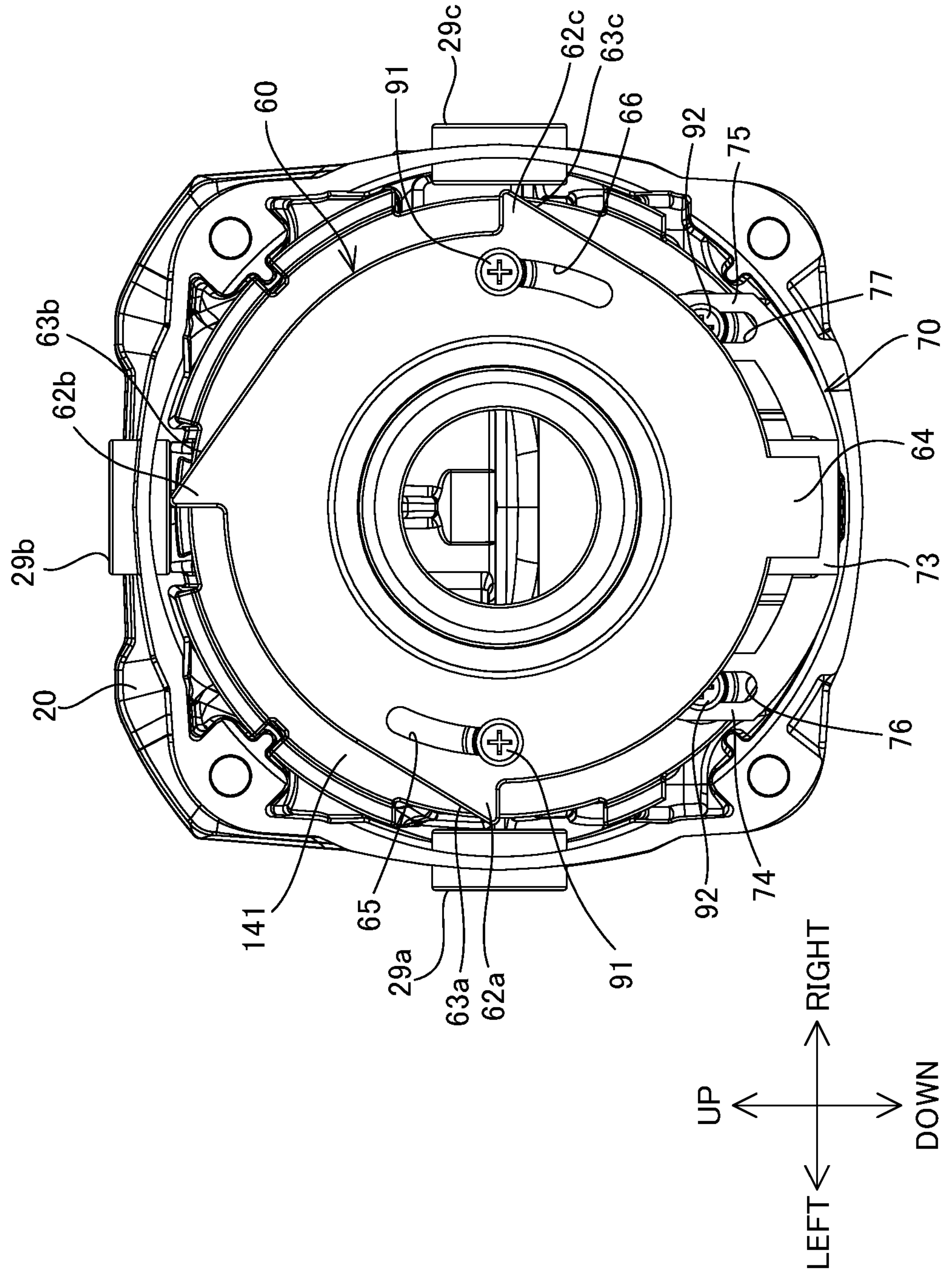
FIG. 14 illustrates the internal structure of the grinder and illustrates the state that the side grip and the wheel cover are detached therefrom.

As illustrated in FIG. 14, the gear housing 20 includes three first attachment portions 29*a* to 29*c* for detachably attaching the side handle 200. The first attachment portions 29*a* to 29*c* are disposed at positions spaced apart from each other in the circumferential direction around the rotational axis AX1. More specifically, the first attachment portion 29*a* is formed on the left surface of the gear housing 20, the first attachment portion 29*b* is formed on the upper surface of the gear housing 20, and the first attachment portion 29*c* is formed on the right surface of the gear housing 20. The three first attachment portions 29*a* to 29*c* are provided at positions rotational symmetric with respect to the rotational axis AX1, respectively. Each of the first attachment portions 29*a* to 29*c* is in the form of a through-hole that establishes communication between the inside and the outside of the gear housing 20. A female screw threadedly engageable with the male screw of the attachment portion 220 is formed on the inner surface forming this through-hole.

The side handle 200 can be attached to the gear housing 20 by screwing the attachment portion 220 of the side handle 200 into selected one from the three first attachment portions 29*a* to 29*c*. The user can arbitrarily select the attachment portion of the side handle 200 from the first attachment portions 29*a* to 29*c* according to the type of the work intended to perform using the grinder 10 or according to whether the user is right-handed or left-handed. The three first attachment portions 29*a* to 29*c* are provided in the present embodiment, but the number of first attachment portions is not especially limited and may be any number equal to or greater than 1. For example, the grinder 10 may include only two first attachment portions 29*a* and 29*c*.

As illustrated in FIG. 1, the cover 300 includes a cover main body 310 to cover a part of the tool accessory 28 therewith, and an attachment portion 320 to be attached to the second attachment portion 22. The cover main body 310 covers an approximately rear half portion of the tool accessory 28. The cover main body 310 covers the upper surface, the lower surface, and the circumferential surface between the upper surface and the lower surface of the tool accessory 28 in the present embodiment, but may cover only the upper surface and the circumferential surface depending on the type of the tool accessory 28 in use. The attachment portion 320 has a generally annular shape with an opening, and extends upward from the upper surface of the cover main body 310. The attachment portion 320 includes opposing two flanges at two distal ends in the circumferential direction, although they are not illustrated because the structure of the attachment portion 320 is well known. A bolt is inserted into a screw hole formed at each of the flanges and is tightened in a state that the attachment portion 320 is disposed so as to surround the second attachment portion 22 of the gear housing 20, by which the radius of the annular shape of the attachment portion 320 reduces and the attachment portion 320 is fixed to the second attachment portion 22.

The above-described grinder 10 has a mechanical configuration that permits the operation member 50 to be displaced from the OFF position to the ON position only in a state that the side handle 200 is attached to any of the first attachment portions 29*a* to 29*c* of the gear housing 20 and the cover 300 is attached to the second attachment portion 22 of the gear housing 20, and prohibits the operation member 50 from being displaced from the OFF position to the ON position in a state that least one of the side handle 200 and the cover 300 is not attached. In the following description, this mechanical configuration will be described in detail with reference to the drawings.

Figure 4:
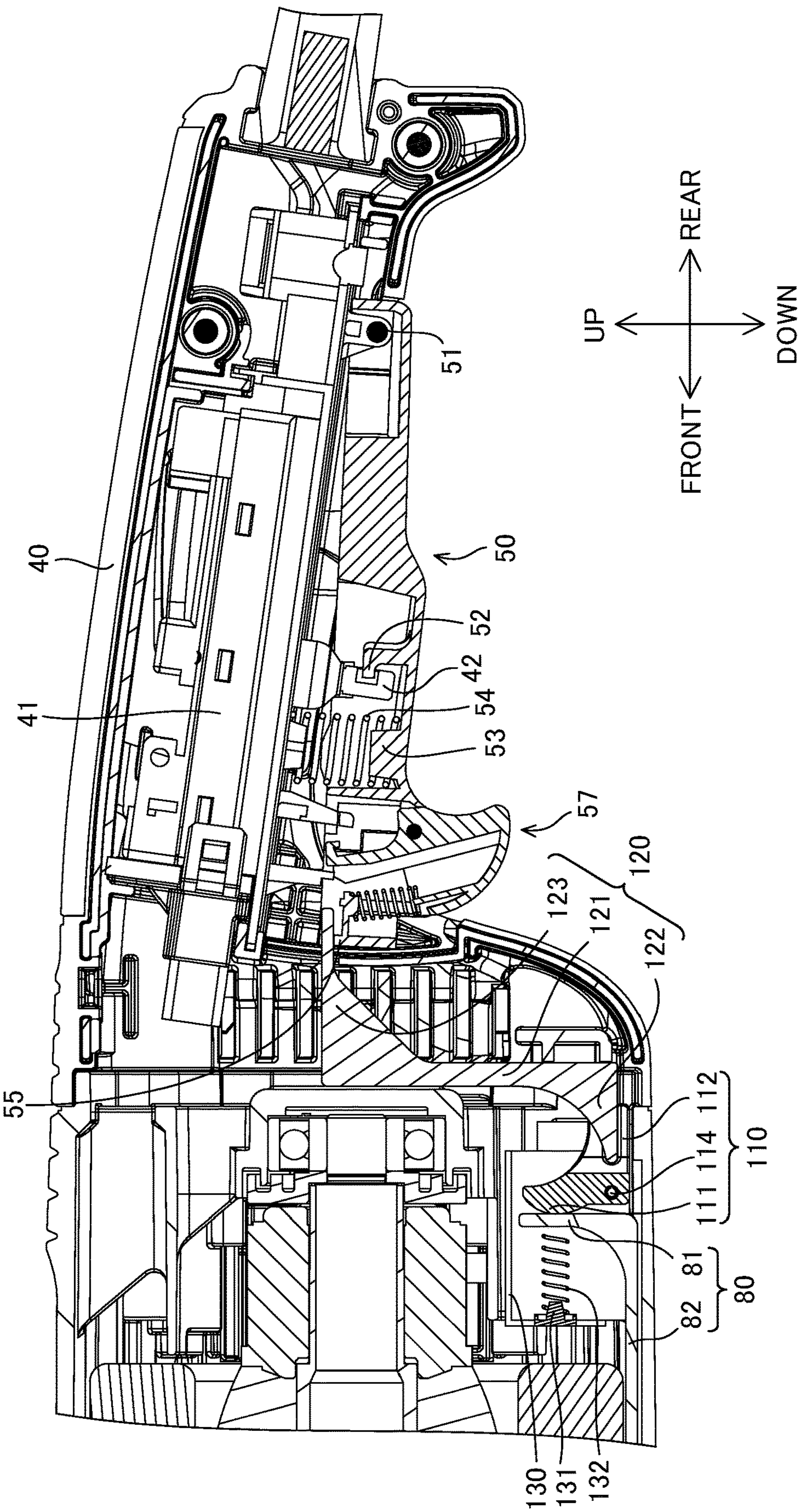
FIG. 4 is a partial enlarged view of the grinder illustrated in FIG. 2.

As illustrated in FIG. 4, the operation member 50 is provided under the handle housing 40. The operation member 50 is a paddle-type member in the present embodiment, but may be embodied in any other form. The operation member 50 extends throughout almost the entire range of the handle housing 40 in the front-rear direction.

The operation member 50 includes a support shaft 51, a protrusion 52, a spring seat 53, a spring 54, and an actuation end portion 55. The support shaft 51 is provided near the rear end of the operation member 50. The support shaft 51 has a circular columnar shape extending in the left-right direction, and is rotatably supported by the handle housing 40. The protrusion 52 extends in an L-shaped manner toward the upper side and the front side at an approximately central position of the operation member 50 in the front-rear direction. The distal end of the protrusion 52 is engaged with an input member 42 of the switch 41. One end of the spring 54 is seated on the spring seat 53. The other end of the spring

54 is seated on the handle housing 40. The spring 54 biases the operation member 50 toward the OFF position. The actuation end portion 55 is the front end of the operation member 50 in the front-rear direction. A second horizontally extending portion 123 of a second link member 120, which will be described below, is placed on the actuation end portion 55.

When the user holds the handle housing 40 and the operation member 50 (i.e., the user presses the operation member 50 upward) in a state that the operation member 50 is located at the OFF position (refer to FIG. 4), the operation member 50 is rotated, against the biasing force of the spring 54, to the ON position (refer to FIG. 3) in a direction toward the handle housing 40 with the support shaft 51 serving as a support point therefor. When the operation member 50 is displaced from the OFF position to the ON position, the protrusion 52 of the operation member 50 is displaced upward and the input member 42 engaged with the protrusion 52 is also displaced upward according thereto. When the operation member 50 reaches the ON position, the input member 42 is pressed into the switch 41. The switch 41 detects that the input member 42 is pressed in, and transmits a signal for driving the electric motor 31 to a controller (not illustrated). When receiving this signal, the controller supplies power to the electric motor 31.

Then, when the user releases his/her finger from the operation member 50, the operation member 50 is returned from the ON position to the OFF position under the biasing force of the spring 54. According thereto, the protrusion 52 and thus the input member 42 are also returned to their original positions. The switch 41 detects that the input member 42 is retracted, and transmits a signal for stopping the electric motor 31 to the controller. When receiving this signal, the controller stops the power supply to the electric motor 31. A lock-off switch 57 is provided near the front end of the operation member 50 in the front-rear direction. The lock-off switch 57 is used to engage the operation member 50 at the OFF position, thereby prohibiting the displacement thereof to the ON position.

As illustrated in FIGS. 1 and 2, the grinder 10 further includes a first intermediate member 60, a second intermediate member 70, a holding member 140, a third intermediate member 80, and a conversion mechanism 100. First, the first intermediate member 60, the second intermediate member 70, the holding member 140, the third intermediate member 80, and the conversion mechanism 100 will be described in outline.

The first intermediate member 60 is configured to be pressed and displaced by the attachment portion 220 of the side handle 200 by the attachment of the side handle 200 to any of the first attachment portions 29*a* to 29*c*. The first intermediate member 60 is rotated by a predetermined angle about the rotational axis AX1 as such a displacement operation in the present embodiment. The first intermediate member 60 is a generally annular member, and is disposed inside the gear housing 20 so as to surround the motor shaft 32 on the front side with respect to the electric motor 31.

The second intermediate member 70 is configured to be pressed and displaced by the attachment portion 320 of the cover 300 by the attachment of the cover 300 to the second attachment portion 22. The second intermediate member 70 is linearly moved upward as such a displacement operation in the present embodiment. The second intermediate member 70 is disposed between the motor shaft 32 and the tool accessory 28 on the front side with respect to the first intermediate member 60. The holding member 140 is disposed on the front side with respect to the first intermediate member 60, and holds the first intermediate member 60 and the second intermediate member 70 together.

Figure 5:
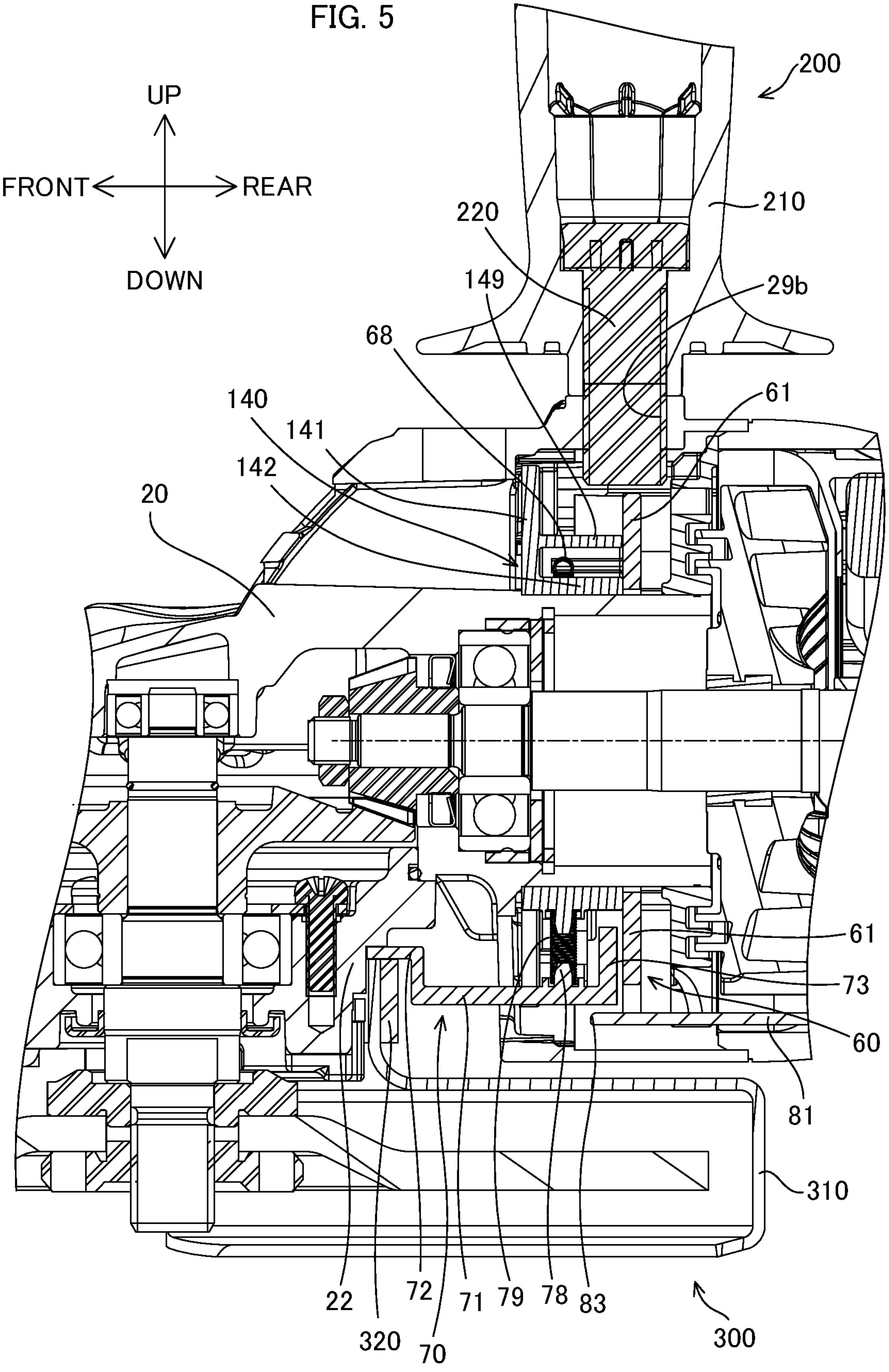
FIG. 5 is a partial enlarged view of the grinder illustrated in FIG. 1.

The third intermediate member 80 is disposed so as to extend in the font-rear direction at the bottom portions of the gear housing 20 and the motor housing 30. The third intermediate member 80 is configured to be displaced in the front-rear direction between an OFF corresponding position (refer to FIG. 6) corresponding to the OFF position of the operation member 50 and an ON corresponding position (refer to FIG. 5) corresponding to the ON position of the operation member 50 in conjunction with the displacement of the operation member 50. The conversion mechanism 100 is configured to change the rotational motion of the operation member 50 generally in the vertical direction into the linear motion of the third intermediate member 80 in the front-rear direction.

The first intermediate member 60 is located at a first blocking position (refer to FIGS. 6 and 14) of blocking a displacement route for displacing the third intermediate member 80 from the OFF corresponding position to the ON corresponding position in a state that the side handle 200 is attached to none of the first attachment portions 29*a* to 29*c* of the gear housing 20, and is located at a first non-blocking position (refer to FIGS. 5, 15, and 16) of not blocking the displacement route of the third intermediate member 80 in a state that the side handle 200 is attached to any of the first attachment portions 29*a* to 29*c*.

The second intermediate member 70 is located at a second blocking position (refer to FIGS. 6, 14, and 15) of blocking the displacement route of the third intermediate member 80 in a state that the cover 300 is not attached to the second attachment portion 22 of the gear housing 20, and is located at a second non-blocking position (refer to FIGS. 5 and 16) of not blocking the displacement route of the third intermediate member 80 in a state that the cover 300 is attached to the second attachment portion 22.

Figure 7:
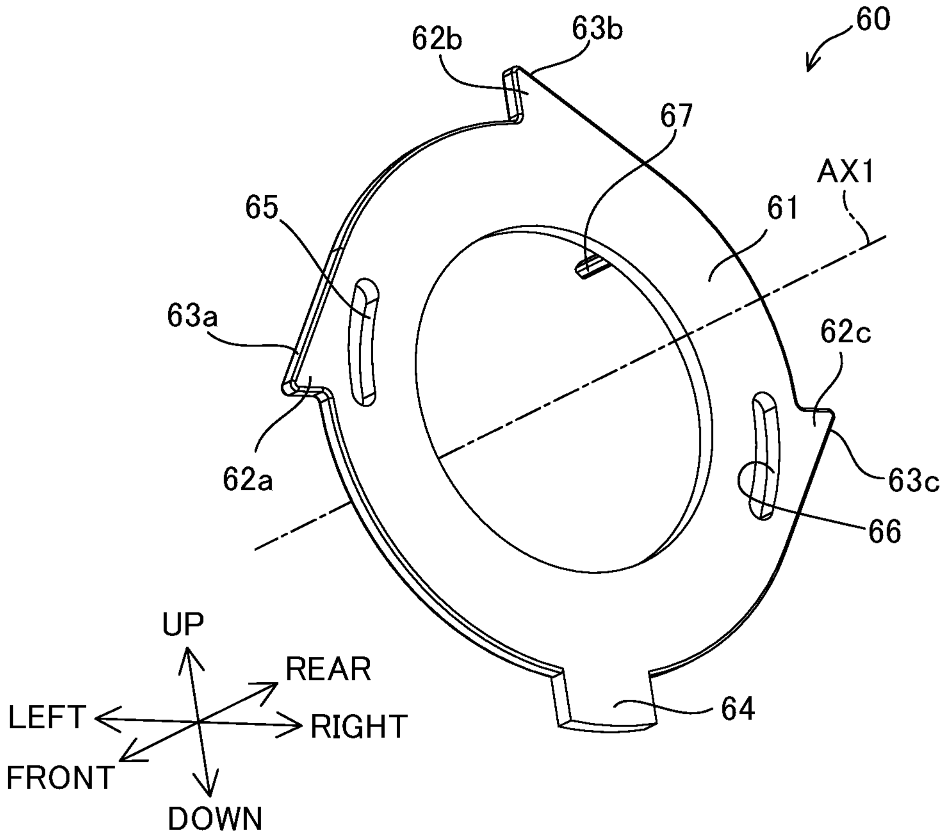
FIG. 7 is a perspective view of a first intermediate member.

In the following description, the first intermediate member 60, the second intermediate member 70, the holding member 140, the third intermediate member 80, and the conversion mechanism 100 will be described in detail. First, the first intermediate member 60 will be described. As illustrated in FIG. 7, the first intermediate member 60 is a single member, and is provided in common for the first attachment portions 29*a* to 29*c*. The first intermediate member 60 includes a first intermediate member main body 61. The first intermediate member main body 61 has an annular shape centered at the rotational axis AX1 of the electric motor 31 in the present embodiment. However, the first intermediate member 60 may have a partially annular shape (i.e., an unclosed annular shape). A through-hole is formed at the central portion of the first intermediate member main body 61. The motor shaft 32 extends through this through-hole.

The first intermediate member 60 further includes three pressed portions 62*a* to 62*c* and a blocking portion 64. The three pressed portions 62*a* to 62*c* are disposed so as to be circumferentially spaced apart from each other. The pressed portion 62*a* is a portion pressed by the side handle 200 (more specifically, the distal end of the attachment portion 220) when the side handle 200 is attached to the first attachment portion 29*a* of the gear housing 20. Similarly, the pressed portion 62*b* is a portion pressed by the side handle 200 when the side handle 200 is attached to the first attachment portion 29*b*, and the pressed portion 62*c* is a portion pressed by the side handle 200 when the side handle 200 is attached to the first attachment portion 29*c*. Therefore, the pressed portions 62*a* to 62*c* are disposed at angular positions corresponding to the angular positions of the first attachment portions 29*a* to 29*c*, respectively (refer to FIG. 14). Each of the pressed portions 62*a* to 62*c* protrudes radially outward from the first intermediate member main body 61.

As described above, the first intermediate member 60 is configured to be rotated about the rotational axis AX1 when any of the pressed portions 62*a* to 62*c* is pressed by the side handle 200. A comparison between FIG. 14 and FIG. 15 makes it understandable that, due to the attachment of the side handle 200 to the first attachment portion 29*c*, the pressed portion 62*c* is pressed by the side handle 200, and the first intermediate member 60 is rotated in the counter-clockwise direction from the position illustrated in FIG. 14 to the position illustrated in FIG. 15.

As illustrated in FIGS. 7 and 14, the pressed portion 62*a* includes a pressed surface 63*a* angled with respect to the longitudinal direction of the side handle 200 when the side handle 200 is attached to the first attachment portion 29*a* (i.e., the attachment direction of the side handle 200). Similarly, the pressed portion 62*b* includes a pressed surface 63*b* angled with respect to the longitudinal direction of the side handle 200 when the side handle 200 is attached to the first attachment portion 29*b*. Similarly, the pressed portion 62*c* includes a pressed surface 63*c* angled with respect to the longitudinal direction of the side handle 200 when the side handle 200 is attached to the first attachment portion 29*c*. The pressed surfaces 63*a* to 63*c* are angled at approximately 45 degrees with respect to the corresponding longitudinal direction of the side handle 200 (refer to FIG. 14). This angle can be set to any angle so as to allow the first intermediate member 60 to be displaced in a direction different from the longitudinal direction of the side handle 200. In an alternative embodiment, this angle may be set within a range of 30 degrees or larger and 60 degrees or smaller. According to the pressed surfaces 63*a* to 63*c* angled in this manner, the first intermediate member 60 can be easily rotated.

The blocking portion 64 is a portion that blocks the displacement route of the third intermediate member 80 when the side handle 200 is attached to none of the first attachment portions 29*a* to 29*c*. The blocking portion 64 protrudes radially outward from the first intermediate member main body 61. The blocking portion 64 is located at the lowermost portion of the first intermediate member 60 when the side handle 200 is attached to none of the first attachment portions 29*a* to 29*c* (refer to FIG. 14). On the other hand, the blocking portion 64 is retracted to the upper side and the right side with respect to the lowermost portion due to the rotation of the first intermediate member 60 when the side handle 200 is attached to any of the first attachment portions 29*a* to 29*c* (refer to FIG. 15).

Figure 15:
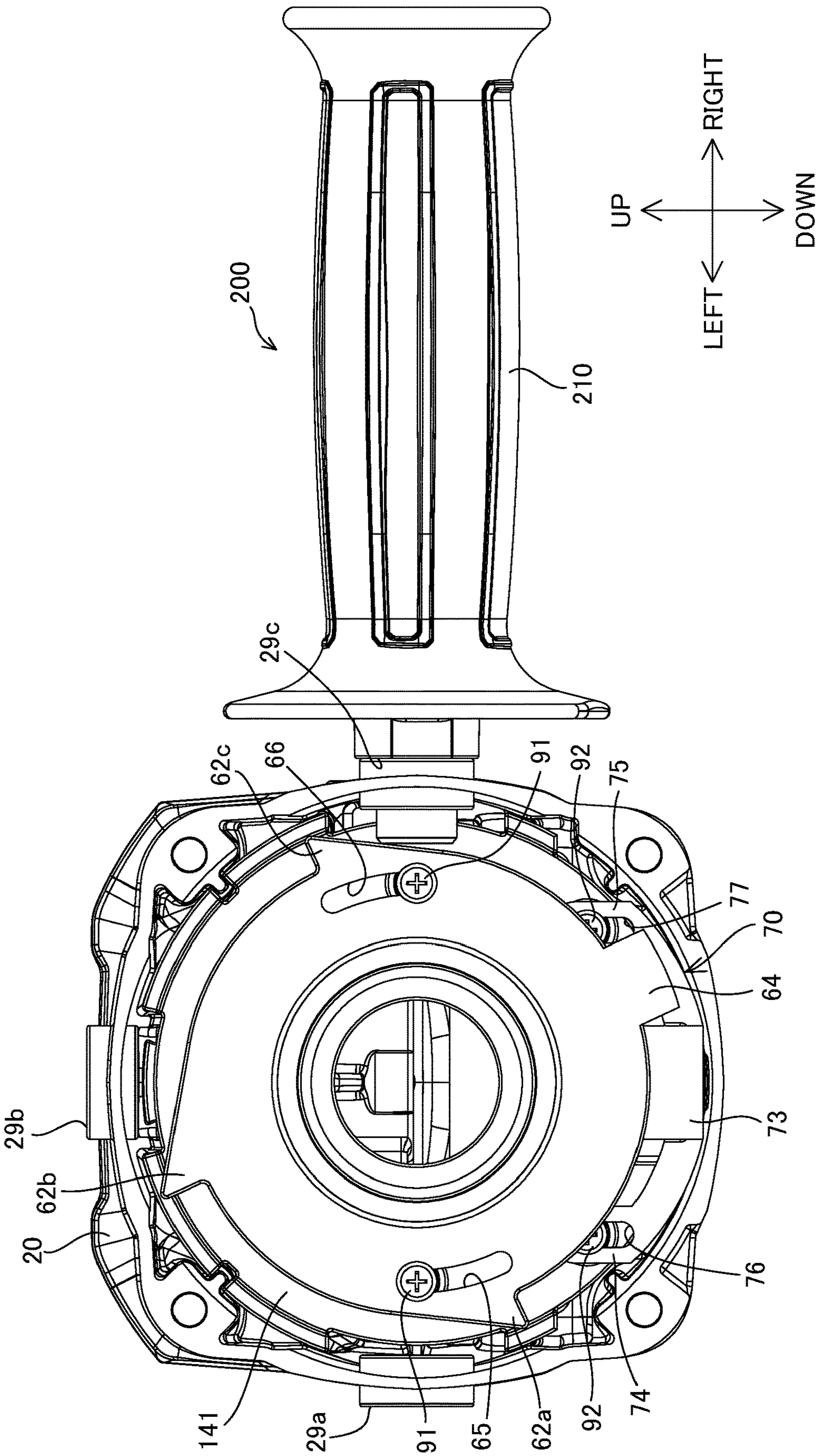
FIG. 15 illustrates the internal structure of the grinder and illustrates a state that the side grip is attached thereto and the wheel cover is detached therefrom.
Figure 16:
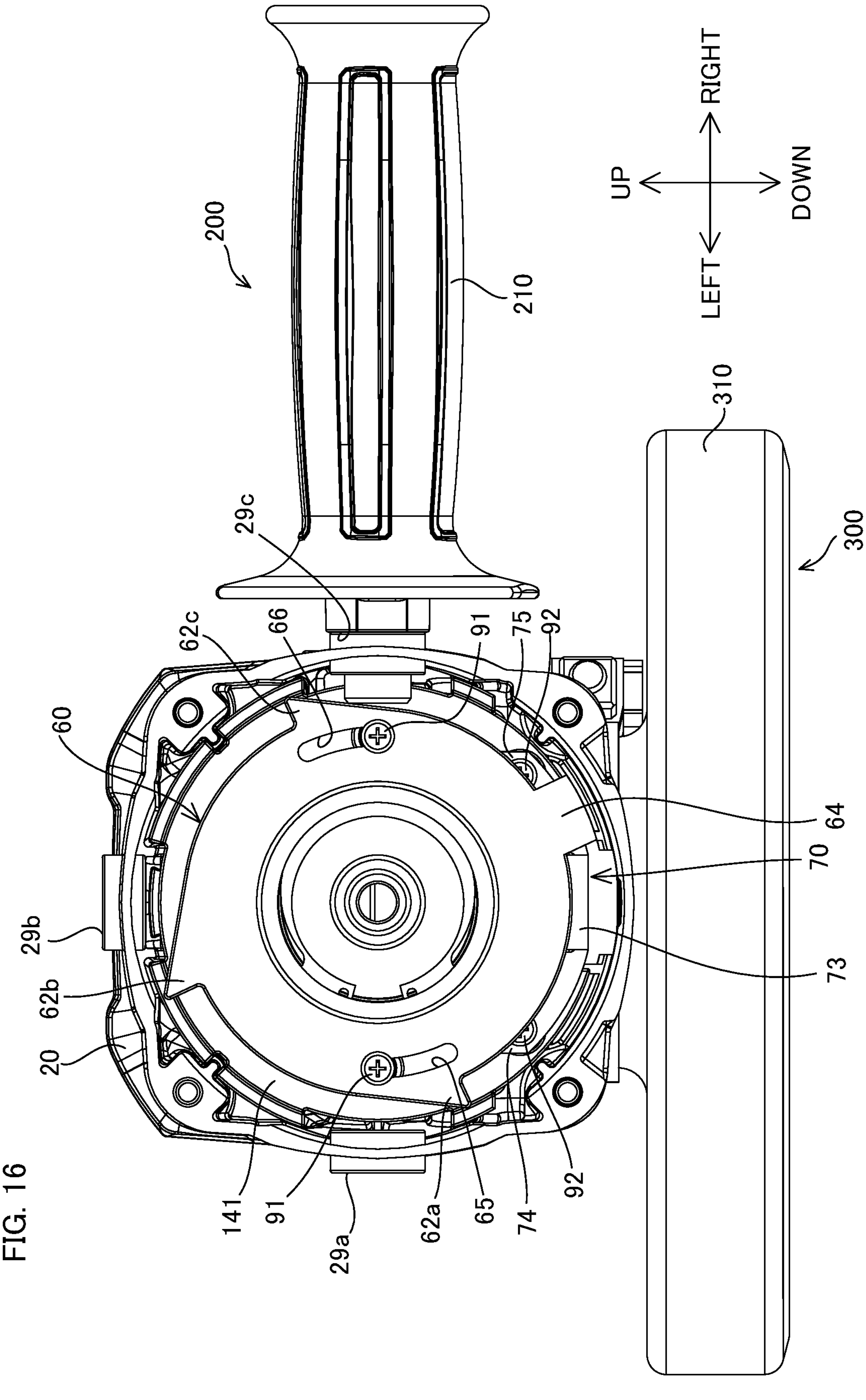
FIG. 16 illustrates the internal structure of the grinder and illustrates the state that the side grip and the wheel cover are attached thereto.

As illustrated in FIG. 7, the first intermediate member main body 61 includes first through-holes 65 and 66. Each of the first through-holes 65 and 66 has a circular-arc shape centered at the rotational axis AX1. The first through-holes 65 and 66 are disposed at positions rotational symmetric by 180 degrees with respect to the rotational axis AX1. The first intermediate member 60 is attached to the holding member 140 using screws via these first through-holes 65 and 66. More specifically, bolts 91 are inserted in the first through-holes 65 and 66 as illustrated in FIGS. 14 to 16. These bolts 91 are threadedly engaged with screw holes 143*a* and 144*a* of the holding member 140, which will be described below. Due to predetermined clearances secured between the heads of the bolts 91 and the first intermediate member 60, the first intermediate member 60 is held by the holding member 140 rotatably along the circular-arc shapes of the first through-holes 65 and 66. According to this configuration, the first intermediate member 60 can be held with a simple structure.

The first intermediate member 60 further includes a protrusion 67. The protrusion 67 extends forward from the front surface of the first intermediate member main body 61. This protrusion 67 is used to bias the first intermediate member 60 toward the first blocking position (refer to FIGS. 6 and 14) by a spring 68 (refer to FIG. 9), which will be described below.

Figure 8:
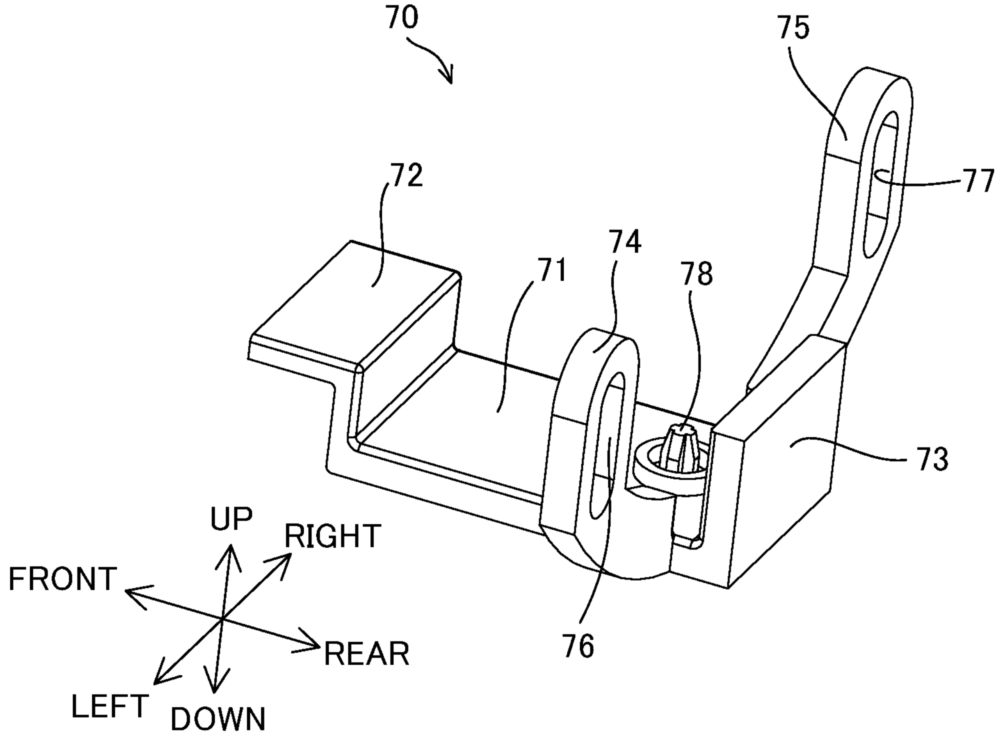
FIG. 8 is a perspective view of a second intermediate member.

Next, the second intermediate member 70 will be described. As illustrated in FIG. 8, the second intermediate member 70 includes a base 71, a pressed portion 72, a blocking portion 73, support portions 74 and 75, and a spring seat 78. The base 71 is a portion shaped like a flat plate having a longitudinal direction extending along the front-rear direction and lying perpendicularly to the vertical direction. The pressed portion 72 is a portion pressed upward by the attachment portion 320 of the cover 300 when the cover 300 is attached to the second attachment portion 22, and is located at the front edge of the second intermediate member 70. The pressed portion 72 is shaped like a flat plate lying in parallel with the base 71. A stepped portion is formed between the base 71 and the pressed portion 72. The displacement amount of the second intermediate member 70 when the cover 300 is attached can be reduced due to this stepped portion. More specifically, when the cover 300 is attached, the second intermediate member 70 is not displaced since the attachment portion 320 of the cover 300 is in a state of being raised to the same position as the base 71 until the attachment portion 320 is brought into a state of abutting against the pressed portion 72, and therefore the displacement amount of the second intermediate member 70 is reduced by an amount corresponding the step compared to a configuration in which the pressed portion 72 is located at the same vertical position as the base 71. This can lead to a reduction in a space for the displacement of the second intermediate member 70. In other words, this can cut down an increase in the vertical size of the grinder 10.

The blocking portion 73 is a portion that blocks the displacement route of the third intermediate member 80 when the cover 300 is not attached to the second attachment portion 22. The blocking portion 73 is located at the rear edge of the second intermediate member 70, and extends upward from the rear edge of the base 71. The blocking portion 73 is shaped like a flat plate extending perpendicularly to the front-rear direction. When the cover 300 is not attached to the second attachment portion 22, the blocking portion 73 is located at a position overlapping the blocking portion 64 of the first intermediate member 60 when the side handle 200 is not attached as viewed in the front-rear direction, as illustrated in FIG. 14.

The support portions 74 and 75 are disposed opposite from each other in the left-right direction on the front side with respect to the blocking portion 73 near the blocking portion 73. The support portions 74 and 75 have generally L-like shapes extending from the base 71 in directions away from each other in the left-right direction, and then bent and extending upward after that. Second through-holes 76 and 77 are formed on the support portions 74 and 75, respectively. The second through-holes 76 and 77 extend through the support portions 74 and 75 in the front-rear direction, respectively. The second through-holes 76 and 77 are each in the form of an elongated hole having a longitudinal direction extending along the vertical direction (i.e., a direction in which the second intermediate member 70 is linearly moved when being pressed by the cover 300). The second intermediate member 70 is attached to the holding member

140 using screws via these second through-holes 76 and 77. More specifically, bolts 92 are inserted in the second through-holes 76 and 77 as illustrated in FIGS. 14 to 16. These bolts 92 are threadedly engaged with screw holes 145*a* and 146*a* of the holding member 140, which will be described below. Due to predetermined clearances respectively secured between the heads of the bolts 92 and the support portions 74 and 75, the second intermediate member 70 is held by the holding member 140 linearly movably along the second through-holes 76 and 77. According to this configuration, the second intermediate member 70 can be held with a simple structure.

The spring seat 78 is provided so as to protrude upward from the base 71. A spring 79 (refer to FIG. 6) is held between the spring seat 78 and a spring seat 148 of the holding member 140 (refer to FIG. 9). The spring 79 biases the second intermediate member 70 toward the second blocking position (refer to FIGS. 6, 14, and 15).

Figure 9:
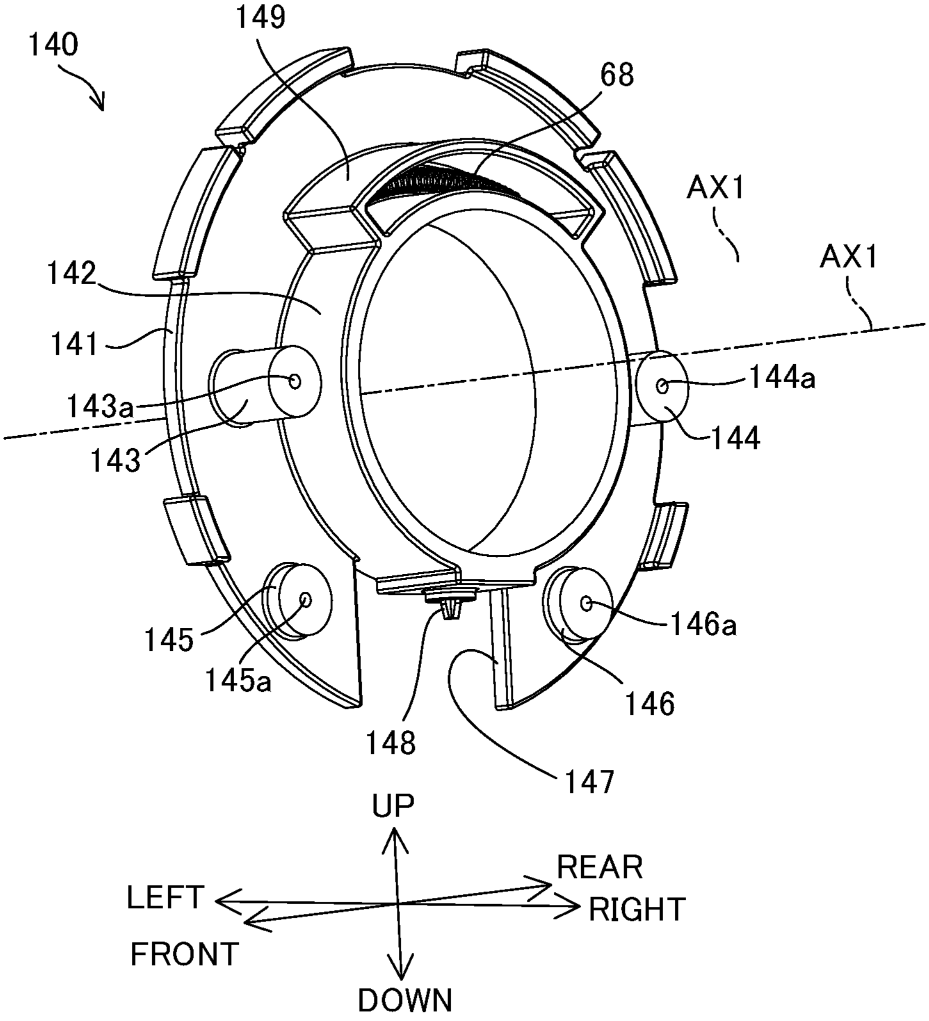
FIG. 9 is a perspective view of a holding member that holds the first intermediate member and the second intermediate member.

Next, the holding member 140 will be described. As illustrated in FIG. 9, the holding member 140 includes an annular portion 141, a hollow circular cylindrical portion 142, protrusion portions 143 and 144, protrusion portions 145 and 146, the spring seat 148, and a spring housing portion 149. The annular portion 141 has a disk-like shape centered at the rotational axis AX1 of the electric motor 31, and a through-hole is formed at the center thereof. A cutout 147 is formed on the lower side of the annular portion 141 to secure the space for the displacement of the second intermediate member 70.

The hollow circular cylindrical portion 142 has a hollow circular cylindrical shape extending rearward from the annular portion 141. The diameter of the hollow circular cylindrical portion 142 is smaller than the diameter of the annular portion 141. The spring housing portion 149 is formed at the upper side of the hollow circular cylindrical portion 142 adjacently to the hollow circular cylindrical portion 142. The spring housing portion 149 is formed to have a circular-arc shape centered at the rotational axis AX1. The spring 68 is housed in the spring housing portion 149. The spring 68 is extensible and compressible along the circular-arc shape of the spring housing portion 149. The rear side of the spring housing portion 149 is opened, and the protrusion 67 of the first intermediate member 60 is inserted in the spring housing portion 149 via this opening. One end of the spring 68 is supported on the inner surface of the spring housing portion 149 (a flat surface located at one end portion of the circular-arc shape), and the other end of the spring 68 is engaged with the protrusion 67. Due to this configuration, the first intermediate member 60 is biased in the clockwise direction (i.e., toward the first blocking position).

The protrusion portions 143 and 144 are disposed so as to be spaced apart from each other in the left-right direction. The protrusion portions 143 and 144 extend rearward from the annular portion 141 at an approximately vertically central position of the annular portion 141. The protrusion portions 143 and 144 include screw holes 143*a* and 144*a* including female screws formed thereon, respectively. The screw holes 143*a* and 144*a* extend forward from the rear end surfaces of the protrusion portions 143 and 144, respectively. The bolts 91 are threadedly engaged with the screw holes 143*a* and 144*a* to mount the first intermediate member 60 to the holding member 140 in the above-described manner (refer to FIG. 14).

The protrusion portions 145 and 146 are disposed so as to be spaced apart from each other in the left-right direction on the lower side with respect to the protrusion portions 143 and 144. The protrusion portions 145 and 146 include screw holes 145*a* and 146*a* including female screws formed thereon, respectively. The screw holes 145*a* and 146*a* extend forward from the rear end surfaces of the protrusion portions 145 and 146, respectively. The bolts 92 are threadedly engaged with the screw holes 145*a* and 146*a* to mount the second intermediate member 70 to the holding member 140 in the above-described manner (refer to FIG. 14). The lengths of the protrusion portions 145 and 146 in the front-rear direction are shorter than the lengths of the protrusion portions 143 and 144 in the front-rear direction to allow the second intermediate member 70 to be held on the front side with respect to the first intermediate member 60.

The above-described spring seat 148 is formed at the lower edge of the hollow circular cylindrical portion 142. This holding member 140 is fitted in the gear housing 20 so as to bring the outer periphery of the annular portion 141 and the inner periphery of the hollow circular cylindrical portion 142 into abutment with the gear housing 20 in a state that the first intermediate member 60 and the second intermediate member 70 are mounted thereto. As a result, the holding member 140 is fixed to the gear housing 20. Mounting the first intermediate member 60 and the second intermediate member 70 to the single holding member 140 automatically determines the relative positions of the first intermediate member 60 and the second intermediate member 70, and therefore the relative positions of the first intermediate member 60 and the second intermediate member 70 do not have to be adjusted when the grinder 10 is assembled.

Figure 10:
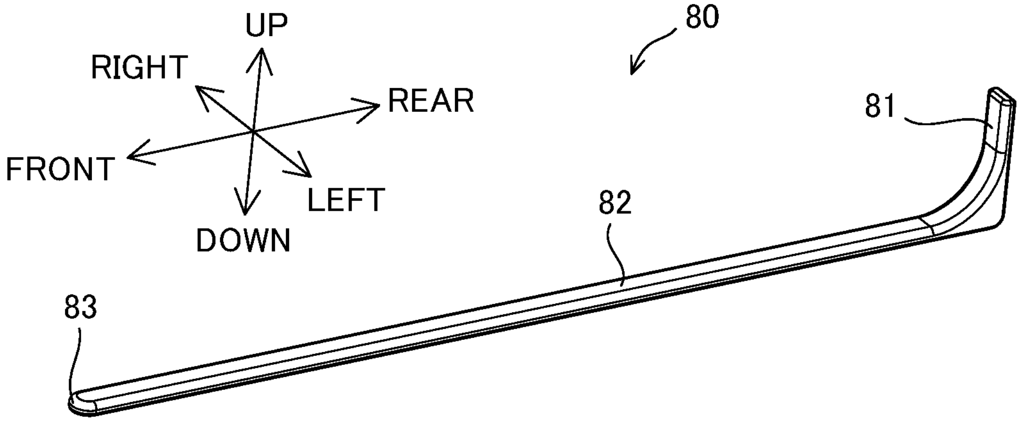
FIG. 10 is a perspective view of a third intermediate member.

Next, the third intermediate member 80 and the conversion mechanism 100 will be described. As illustrated in FIG. 10, the third intermediate member 80 includes a vertically extending portion 81 and a horizontally extending portion 82. The vertically extending portion 81 extends vertically. The horizontally extending portion 82 is shaped like an elongate rod extending forward from the lower end of the vertically extending portion 81. The horizontally extending portion 82 includes a front end 83.

Figure 11:
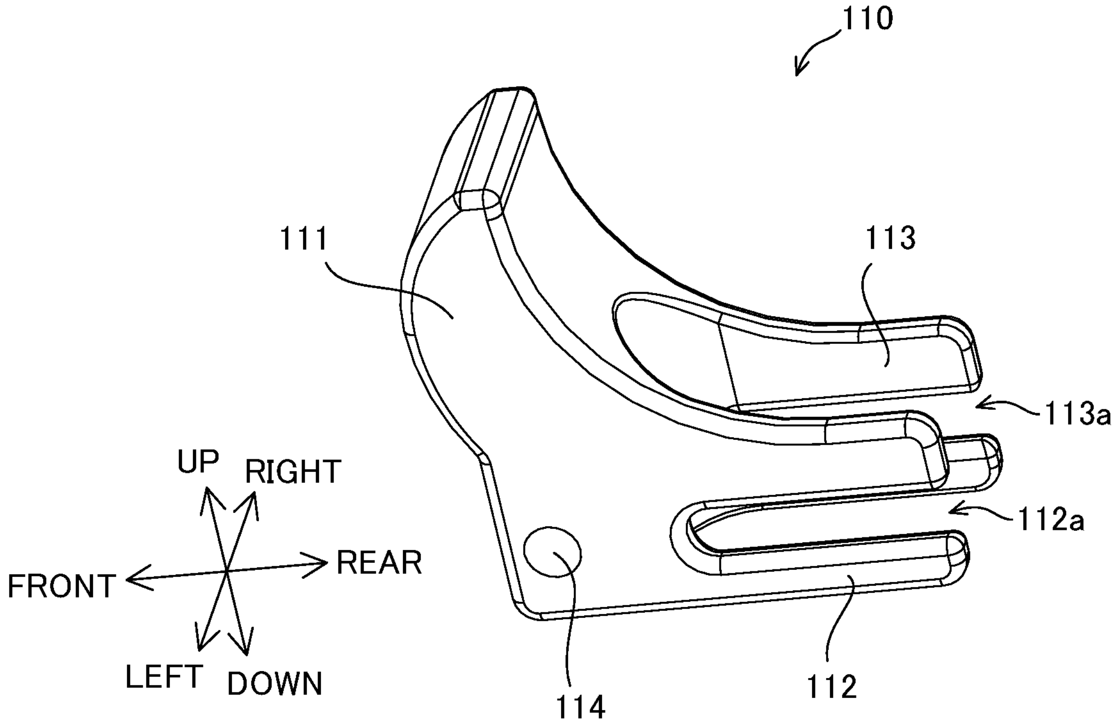
FIG. 11 is a perspective view illustrating a component of a conversion mechanism.

As illustrated in FIG. 1, the conversion mechanism 100 includes a first link member 110, a second link member 120, and a holding member 130. As illustrated in FIG. 11, the first link member 110 includes a pressing portion 111, engagement portions 112 and 113, and a through-hole 114. The pressing portion 111 is located on the front side and the upper side of the first link member 110. The pressing portion 111 includes a circular-arc curved surface facing forward. The engagement portion 112 is a portion extending in a U-shaped manner rearward at the left edge of the first link member 110. The engagement portion 112 includes a groove 112*a* opened on the rear side thereof. The engagement portion 113 is a portion extending in a U-shaped manner rearward at the right edge of the first link member 110. The engagement portion 113 includes a groove 113*a* opened on the rear side thereof. The engagement portions 112 and 113 are formed at positions completely overlapping each other as viewed from the left-right direction. The through-hole 114 is located on the front side and the lower side of the first link member 110, and extends through the first link member 110 in the left-right direction.

Figure 12:
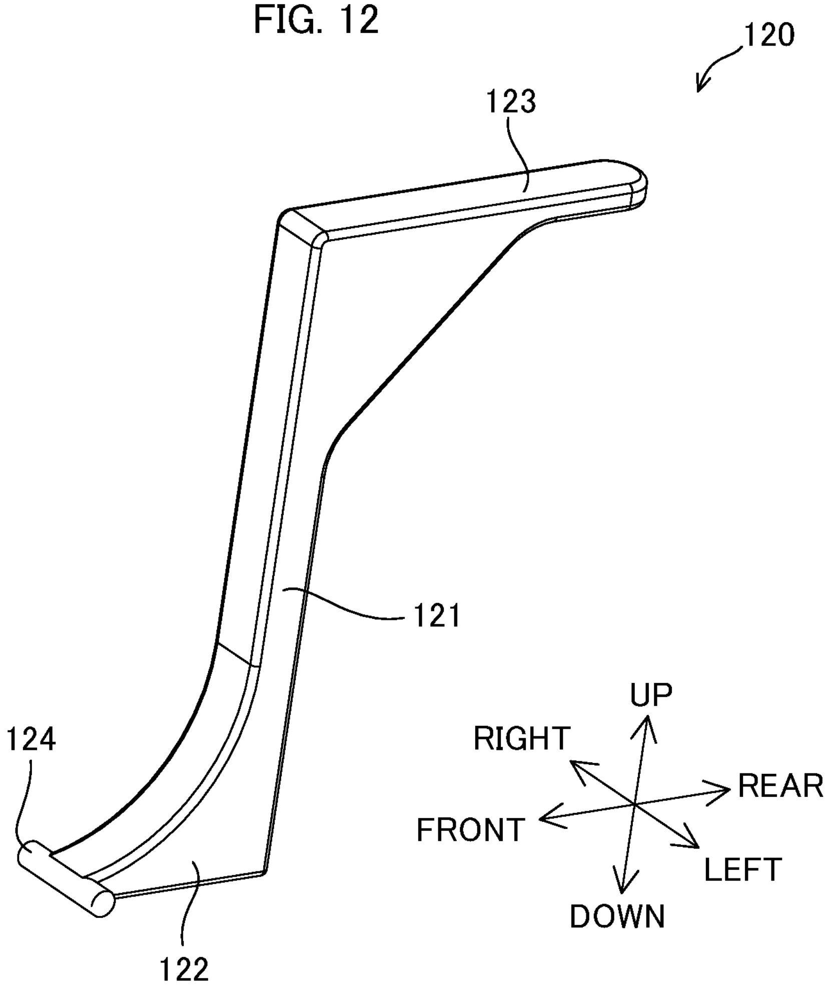
FIG. 12 is a perspective view illustrating a component of the conversion mechanism.

As illustrated in FIG. 12, the second link member 120 includes a vertically extending portion 121, a first horizontally extending portion 122, and a second horizontally extending portion 123. The vertically extending portion 121 extends vertically. The first horizontally extending portion 122 extends forward from the lower end of the vertically extending portion 121. The second horizontally extending portion 123 extends rearward from the upper end of the vertically extending portion 121. A support shaft 124 is formed at the front edge of the first horizontally extending portion 122. The support shaft 124 extends in the left-right direction in a circular columnar manner.

Figure 13:
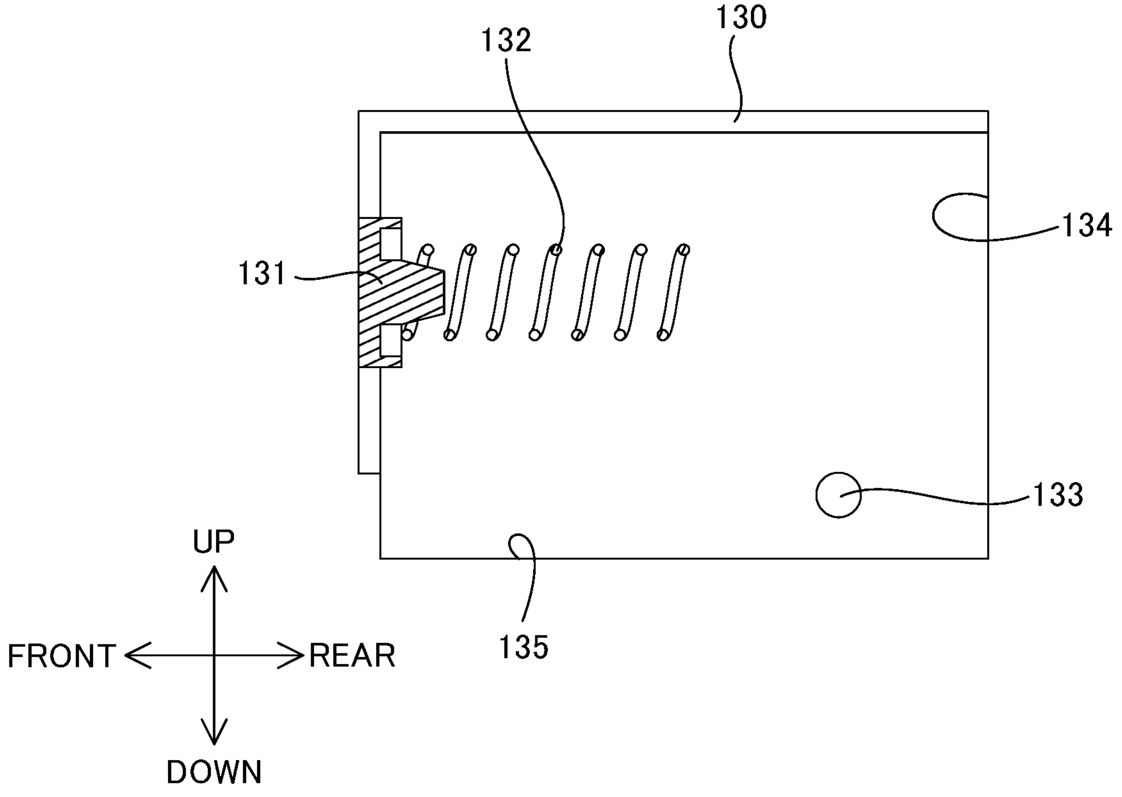
FIG. 13 is a perspective view illustrating the components of the conversion mechanism.

As illustrated in FIG. 13, the holding member 130 is shaped like a generally cubic box. A spring seat 131 is formed on the front inner surface of the holding member 130. A spring 132 is fixed to the spring seat 131 extensibly and compressibly in the front-rear direction in the holding member 130. The holding member 130 is opened on the rear side and the lower side thereof, and an opening 134 and an opening 135 are formed on the rear side and the lower side, respectively. The holding member 130 includes a through-hole 133 extending through the left surface and the right surface of the holding member 130 in the left-right direction.

As illustrated in FIG. 4, due to a pin inserted so as to extend through the through-hole 114 of the first link member 110 and the through-hole 133 of the holding member 130, the first link member 110 is supported by the holding member 130 rotatably about this pin. The third intermediate member 80 is disposed in such a manner that the vertically extending portion 81 is located between the spring 132 and the pressing portion 111 of the first link member 110. Due to this configuration, the third intermediate member 80 is biased rearward by the spring 132. The second link member 120 is disposed in such a manner that the support shaft 124 is inserted in the groove 112*a* of the engagement portion 112 and the groove 113*a* of the engagement portion 113, and that the rear edge portion of the second horizontally extending portion 123 is placed on the actuation end portion 55 of the operation member 50. The grinder 10 can be easily assembled by installing the holding member 130 on the grinder 10 after mounting the first link member 110 to the holding member 130, compared to directly installing the first link member 110 on, for example, the housing of the grinder 10.

Figure 3:
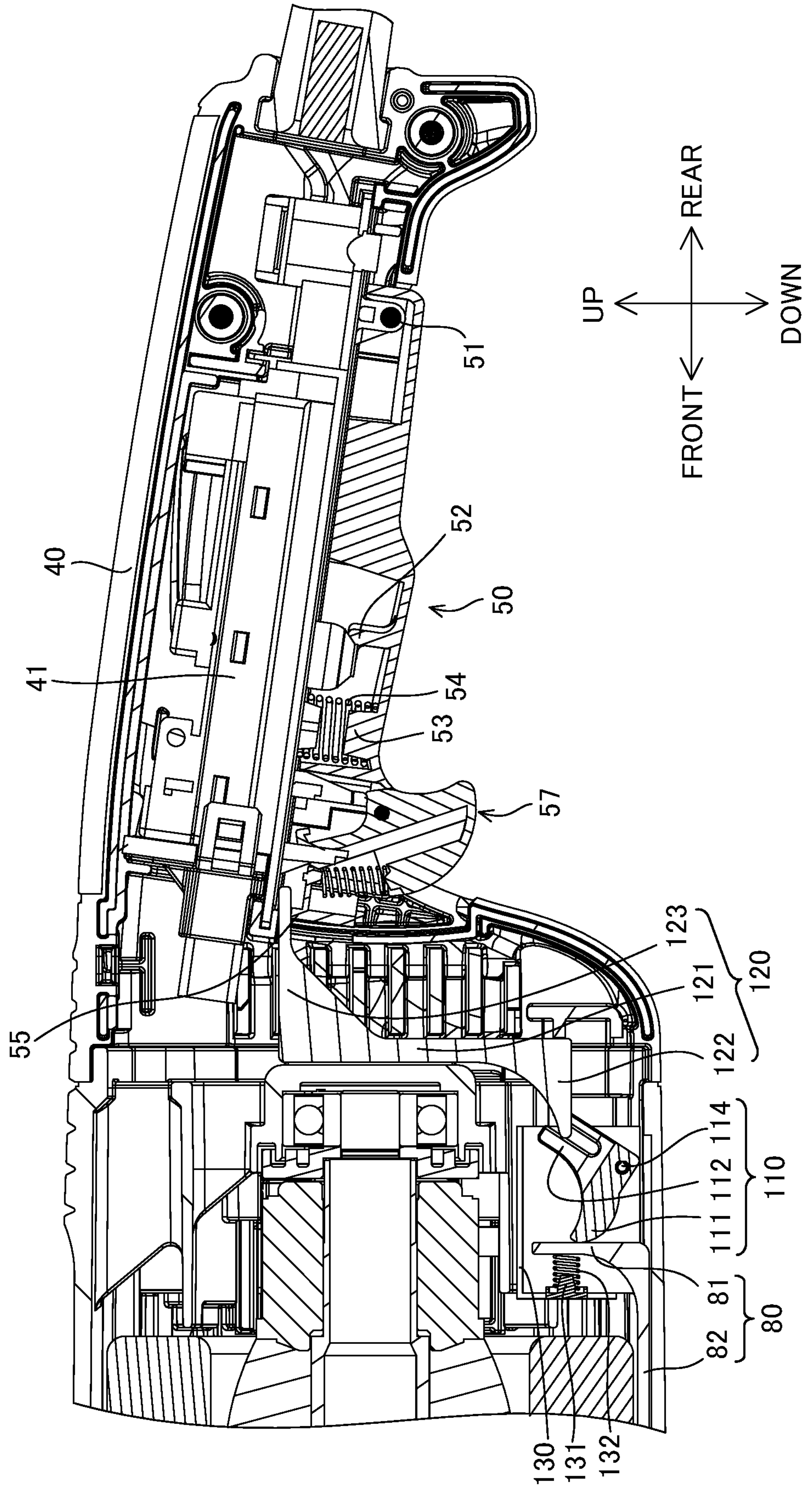
FIG. 3 is a partial enlarged view of the grinder illustrated in FIG. 1.

According to this conversion mechanism 100, the rotational motion of the operation member 50 generally in the vertical direction can be changed to the linear motion of the third intermediate member 80 in the front-rear direction. More specifically, when the operation member 50 is displaced from the OFF position illustrated in FIG. 4 to the ON position illustrated in FIG. 3, the actuation end portion 55 of the operation member 50 is displaced upward. At this time, as illustrated in FIG. 3, the second horizontally extending portion 123 of the second link member 120 is pressed upward by the actuation end portion 55 of the operation member 50. According thereto, the entire second link member 120 is linearly moved upward. At this time, since the support shaft 124 of the second link member 120 is inserted in the grooves 112*a* and 113*a* of the first link member 110, the engagement portions 112 and 113 engaged with the support shaft 124 receive an upward force. According thereto, the first link member 110 is rotated about the pin inserted in the through-hole 114. At this time, the pressing portion 111 of the first link member 110 applies a forward force to the vertically extending portion 81 while being slidably moving on the vertically extending portion 81 of the third intermediate member 80. As a result, the third intermediate member 80 is linearly moved forward against the biasing force of the spring 132. On the other hand, when the operation member 50 is returned from the ON position to the OFF position, the third intermediate member 80 is returned to the position illustrated in FIG. 6 under the biasing force of the horizontally extending portion 82. At this time, the first link member 110 is rotated and returned to the original position by being pressed rearward by the third intermediate member 80, and the second link member 120 engaged with the engagement portions 112 and 113 is also returned to the original position by being pulled downward.

According to this conversion mechanism 100, the operation member 50 and the third intermediate member 80 can be moved in conjunction with each other even with the operation member 50 and the third intermediate member 80 displaced in different directions. Therefore, the displacement direction of the operation member 50 is free of design constraints, and thus an optimum type of operation member 50 can be employed according to the specifications of the grinder 10.

Figure 6:
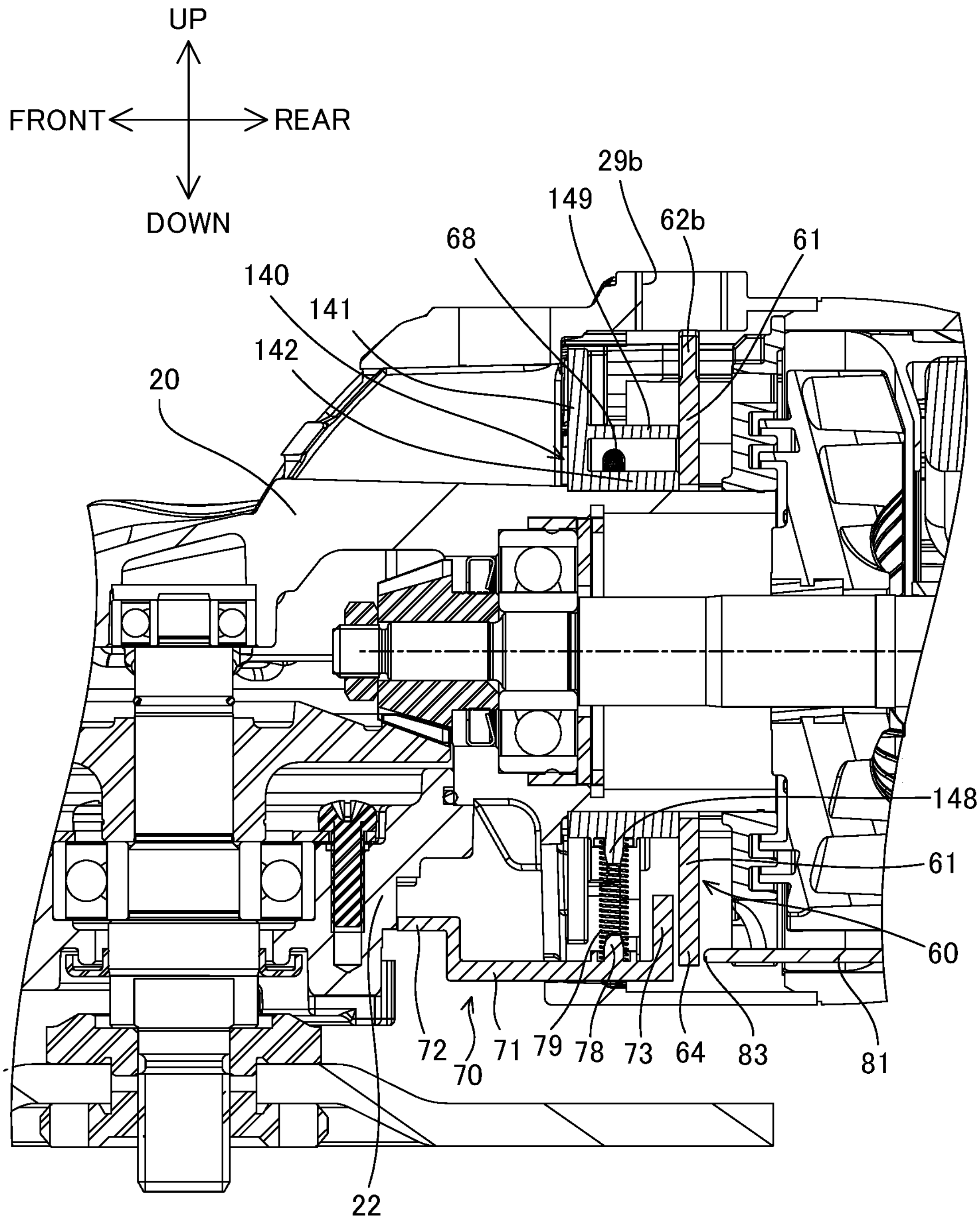
FIG. 6 is a partial enlarged view of the grinder illustrated in FIG. 2.

According to the above-described grinder 10, the first intermediate member 60 is located at the first blocking position illustrated in FIGS. 6 and 14 (i.e., the position of blocking the route of the displacement of the third intermediate member 80 in the front-rear direction) in the state that the side handle 200 is not attached. In this state, when the user tries to operate the operation member 50 from the OFF position to the ON position, the front end 83 of the third intermediate member 80 moved in conjunction with the operation member 50 abuts against the blocking portion 64 of the first intermediate member 60, and therefore the third intermediate member 80 cannot be displaced forward more than that as clearly seen from FIG. 6. Therefore, the operation member 50 can neither be displaced to the ON position.

Further, the second intermediate member 70 is located at the second blocking position illustrated in FIGS. 6 and 15 (i.e., the position of blocking the route of the displacement of the third intermediate member 80 in the front-rear direction) in the state that the cover 300 is not attached. In this state, when the user tries to operate the operation member 50 from the OFF position to the ON position, the front end 83 of the third intermediate member 80 moved in conjunction with the operation member 50 abuts against the blocking portion 73 of the second intermediate member 70, and therefore the third intermediate member 80 cannot be displaced forward more than that as clearly seen from FIG. 6, even when the first intermediate member 60 is located at the first non-blocking position illustrated in FIG. 14 (i.e., the position of not blocking the route of the displacement of the third intermediate member 80 in the front-rear direction). Therefore, the operation member 50 can neither be displaced to the ON position.

On the other hand, when the side handle 200 is attached, the first intermediate member 60 is rotated against the biasing force of the spring 68 by being pressed by the side handle 200, and the blocking portion 64 of the first intermediate member 60 is displaced to a position of not blocking the route of the displacement of the third intermediate member 80 in the front-rear direction. Further, when the cover 300 is attached, the second intermediate member 70 is linearly moved against the biasing force of the spring 79 by being pressed by the cover 300, and the blocking portion 73 of the second intermediate member 70 is displaced to a position of not blocking the route of the displacement of the third intermediate member 80 in the front-rear direction. At this time, the third intermediate member 80 can be displaced forward without abutting against the first intermediate member 60 and the second intermediate member 70 as clearly seen from FIG. 5. Therefore, the operation member 50 can be displaced to the ON position. Therefore, the configuration that allows the electric motor 31 to be driven only when both the side handle 200 and the cover 300 are attached can be realized using only a mechanical structure without using a sensor.

Further, the first intermediate member 60 is configured to be rotated about the rotational axis AX1 when any of the pressed portions 62*a* to 62*c* is pressed by the side handle 200. This eliminates the necessity of securing a space for the displacement of the first intermediate member 60 in the front-rear direction, thereby allowing the grinder 10 to have a compact size in the front-rear direction.

Further, the second intermediate member 70 is pressed by the cover 300 (more specifically, the attachment portion 320) and is linearly moved in the attachment direction of the cover 300 (i.e., upward) when the cover 300 is attached. This eliminates the necessity of a direction conversion mechanism, thereby contributing to the simplification of the apparatus configuration.

Figure 17:
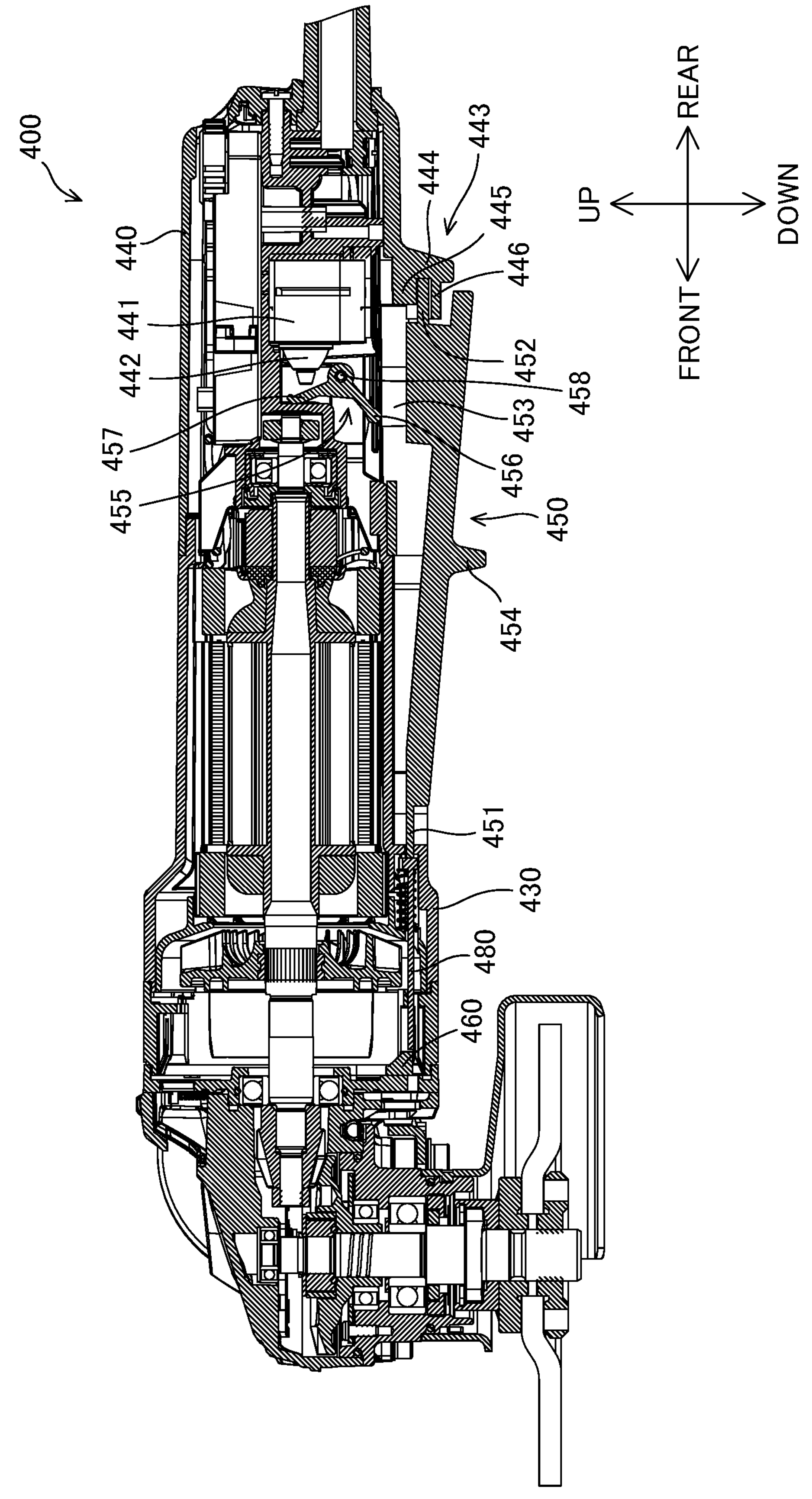
FIG. 17 is a vertical cross-sectional view of a grinder according to a second embodiment of the present invention, and illustrates a state that a side grip is not attached thereto and an operation member is located at a lock-off position.

In the following description, a second embodiment of the present invention will be described with reference to FIGS. 17 to 21. In the following description, the second embodiment will be described focusing only on differences from the first embodiment. As illustrated in FIG. 17, a grinder 400 according to the second embodiment includes an operation member 450, a lock-off portion 443, a first intermediate member 460, and a second intermediate member 480.

As illustrated in FIG. 17, the operation member 450 is an elongated member extending in the front-rear direction, and is disposed under a motor housing 430 and a handle housing 440. The operation member 450 includes an actuation end portion 451, an engagement portion 452, a protrusion 453, and a protrusion 454. The actuation end portion 451 is the front end portion of the operation member 450, and has a thinner thickness (a vertical width) than the other portions. The actuation end portion 451 extends through a through-hole 431 formed on the motor housing 430 (refer to FIG. 20) and reaches the inside of the motor housing 430. The engagement portion 452 is a portion to be engaged with the lock-off portion 443, which will be described below, and is in the form of a protrusion protruding rearward at the rear end portion of the operation member 450. The protrusion 453 protrudes upward at the upper portion of the operation member 450. The protrusion 453 is disposed on the rear side of the operation member 450 in the front-rear direction. The protrusion 454 protrudes downward at the lower portion of the operation member 450. The protrusion 454 is disposed at an approximately central position of the operation member 450 in the front-rear direction.

This operation member 450 is vertically pivotal with a supporting point therefor placed at a portion of the actuation end portion 451 that is located within the through-hole 431. When the operation member 450 is displaced upward from an OFF position illustrated in FIG. 17, which is the initial position, to an ON position illustrated in FIG. 19, a switch 441 is switched from an OFF state to an ON state via a pivotal member 455.

More specifically, the pivotal member 455 is disposed above the protrusion 453 of the operation member 450. The pivotal member 455 is configured pivotally about a pin 458 supported on a boss of the handle housing 440, and includes a first portion 456 and a second portion 457 extending outward in the radial direction with respect to a pivotal axis thereof. The first portion 456 is disposed immediately above the protrusion 453, and the second portion 457 is disposed on the upper side with respect to the first portion 456. The pivotal member 455 is biased in the counterclockwise direction so as to bring the first portion 456 into abutment with the protrusion 453 of the operation member 450 by a biasing member (for example, a torsion spring), although this is not illustrated.

When the user performs an operation of pressing the operation member 450 upward in a lock-off released state, which will be described below, the operation member 450 is pivotally moved upward. According thereto, the protrusion 453 displaces the first portion 456 of the pivotal member 455 upward against the biasing force of the biasing member, and the pivotal member 455 is pivotally moved in the clockwise direction. As a result, the second portion 457 is also integrally pivotally moved in the clockwise direction. Then, when the operation member 450 is pivotally moved to the ON position illustrated in FIG. 19, an input member 442 of the switch 441 is pressed by the second portion 457 and is pressed into the switch 441. As a result, the switch 441 is switched from the OFF state to the ON state. When the user releases the upward pressing operation on the operation member 450, the operation member 450 is pivotally moved downward under the biasing force of the biasing member biasing the pivotal member 455 and is returned to the OFF position illustrated in FIG. 17. At this time, the pivotal member 455 is also returned to the position illustrated in FIG. 17 under the biasing force of the biasing member, and the input member 442 is also retracted from the switch 441. As a result, the switch 441 is returned from the ON state to the OFF state.

The lock-off portion 443 has a similar function to the lock-off switch 57 according to the first embodiment. More specifically, the lock-off portion 443 is configured to switch the status of the operation member 450 between a lock-off state, in which the operation member 450 is prohibited from being displaced from the OFF position to the ON position, and the lock-off released state, in which the operation member 450 is permitted to be displaced from the OFF position to the ON position, according to a change in the engagement state with the operation member 450. The lock-off portion 443 is a fixed (i.e., non-displaceable) engagement structure in contrast to the lock-off switch 57 according to the first embodiment, in which the lock-off switch 57 itself is displaced. In the present embodiment, the lock-off portion 443 is formed on the rear side with respect to the operation member 450 as a part of the handle housing 440 (more specifically, a rear and lower part).

As illustrated in FIG. 17, the lock-off portion 443 includes a base portion 444, an engagement portion 445, and a support portion 446. The base portion 444 is a portion protruding downward from the lower portion of the handle housing 440. The engagement portion 445 and the support portion 446 protrude forward from the base portion 444. The engagement portion 445 is located on the upper side with respect to the support portion 446, and a recessed portion opened on the front side thereof is formed between the engagement portion 445 and the support portion 446. The support portion 446 extends to the front side more than the engagement portion 445.

As illustrated in FIG. 17, the operation member 450 is held displaceably in the front-rear direction and the vertical direction in a retained state due to the insertion of the actuation end portion 451 in the through-hole 431 and the placement of the engagement portion 452 on the support portion 446. The operation member 450 is displaced in the front-rear direction and the vertical direction by the user's manual operation. The user can easily displace the operation member 450 in the front-rear direction by placing his/her finger on the protrusion 454.

As illustrated in FIG. 17, the first intermediate member 460 is disposed on the front side with respect to the operation member 450. The first intermediate member 460 is configured identically or similarly to the first intermediate member 60 according to the first embodiment, and is configured to be displaced by being directly or indirectly pressed by a side handle when the side handle as the accessory (not illustrated) is attached to an attachment portion (not illustrated).

Figure 20:
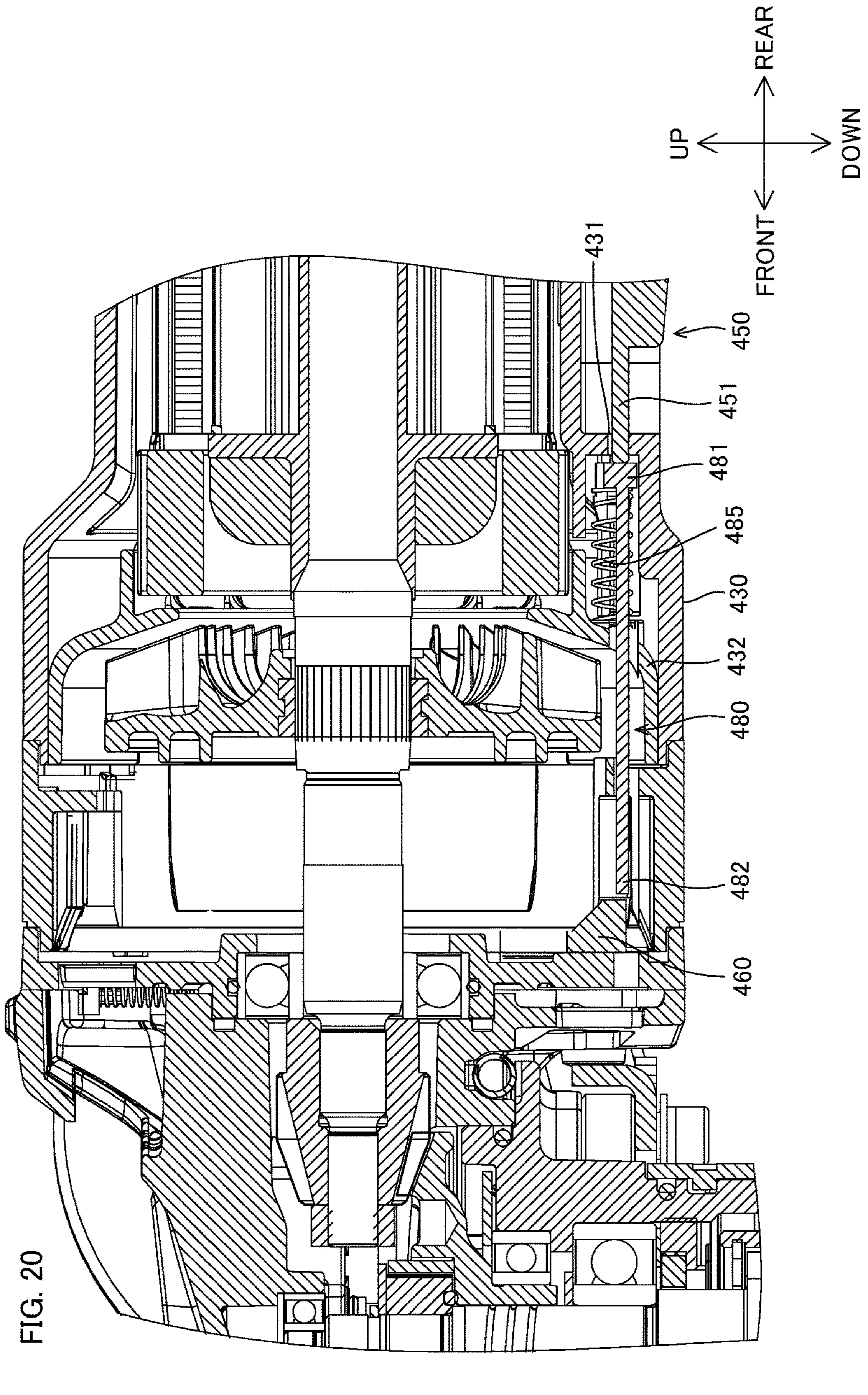
FIG. 20 is a partial enlarged view of the grinder illustrated in FIG. 17.

As illustrated in FIGS. 17 and 20, the second intermediate member 480 is disposed, displaceably in the front-rear direction, between the first intermediate member 460 and the operation member 450 in the front-rear direction. As illustrated in FIG. 20, the second intermediate member 480 is a rod-like member extending in the front-rear direction in the present embodiment. An increased diameter portion 481, which is larger in diameter than the other portions, is formed at the rear end of the second intermediate member 480. The "diameter" here is intended to mean a length around the front-rear direction, and the cross-sectional shape of the second intermediate member 480 and/or the increased diameter portion 481 in a direction perpendicular to the front-rear direction is not limited to a circular shape.

As illustrated in FIG. 20, a coil spring 485 as a biasing member is disposed around the second intermediate member 480. The coil spring 485 is held in a compressed state between a baffle plate 432 fitted in the motor housing 430 and the increased diameter portion 481. The second intermediate member 480 is constantly biased by the coil spring 485 rearward, i.e., toward the side where the operation member 450 is located. Therefore, the increased diameter portion 481 is constantly in abutment with the actuation end portion 451 of the operation member 450 in the front-rear direction regardless of the position of the second intermediate member 480 in the front-rear direction. When the user displaces the operation member 450 forward, the second intermediate member 480 is pressed forward against the biasing force of the coil spring 485 by the operation member 450 and is displaced forward together with the operation member 450. On the other hand, when the user releases the force displacing the operation member 450 forward, the operation member 450 and the second intermediate member 480 are returned to their original positions under the biasing force of the coil spring 485. In this manner, the second intermediate member 480 is configured to be moved in conjunction with the displacement of the operation member 450 in the front-rear direction.

The functions of the grinder 400 configured in this manner will be described now. First, as illustrated in FIG. 17, when the operation member 450 is in the lock-off state at the OFF position, the engagement portion 452 of the operation member 450 is contained in the recessed portion between the engagement portion 445 and the support portion 446 of the lock-off portion 443. The position of the operation member 450 at this time will be referred to as a lock-off position. When the operation member 450 is located at the lock-off position, the engagement portion 445 is located right above the engagement portion 452, and therefore the upward displacement of the operation member 450 is restricted due to the abutment of the engagement portion 452 with the engagement portion 445 even if the user tries to perform the operation of pressing the operation member 450 upward. Therefore, the operation member 450 is prohibited from being displaced from the OFF position (refer to FIG. 17) to the ON position (refer to FIG. 19). When the operation member 450 is in the lock-off state at the OFF position, the second intermediate member 480 is located at a position illustrated in FIG. 20 without being pressed forward by the operation member 450. The position of the second intermediate member 480 at this time will be referred to as a first corresponding position.

The user should displace the operation member 450 forward to bring the operation member 450 kept in the lock-off state into the lock-off released state. However, as illustrated in FIG. 20, the first intermediate member 460 is located in front of the second intermediate member 480 in the state that the side handle is not attached to the attachment portion. Therefore, when the user tries to displace the operation member 450 forward, the distal end 482 of the second intermediate member 480 moved in conjunction with the operation member 450 abuts against the first intermediate member 460, and therefore the forward displacement of the second intermediate member 480 (and thus the operation member 450) is restricted. In this manner, the first intermediate member 460 prohibits the status of the operation member 450 from being switched from the lock-off position state to the lock-off released state with the aid of abutment between members (the abutment between the first intermediate member 460 and the distal end 482 of the second intermediate member 480 in the present example). In other words, the first intermediate member 460 blocks the displacement route for displacing the second intermediate member 480 forward from the first corresponding position.

Figure 18:
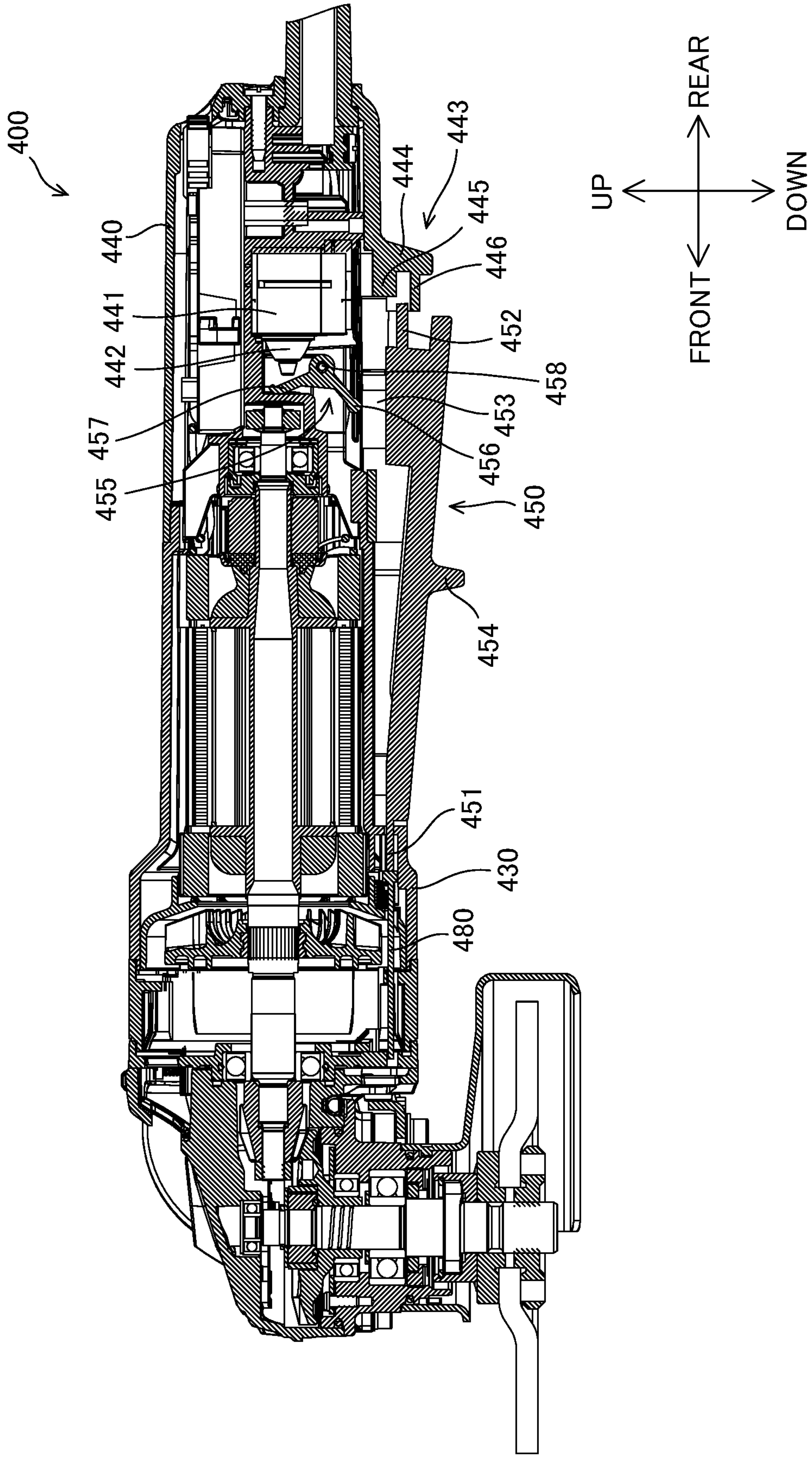
FIG. 18 is a vertical cross-sectional view of the grinder according to the second embodiment, and illustrates a state that the side grip is attached thereto and the operation member is located at a lock-off released position and an OFF position
Figure 21:
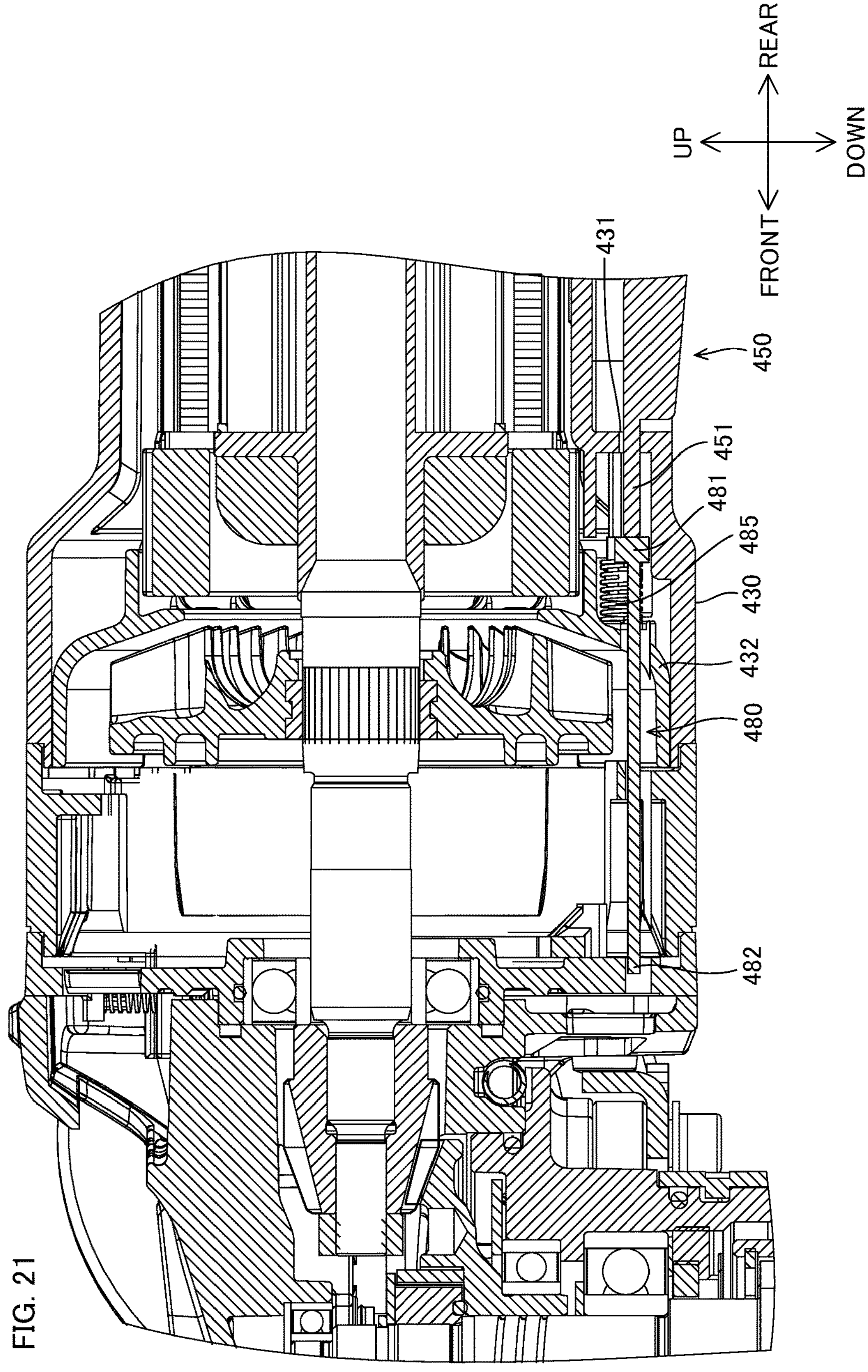
FIG. 21 is a partial enlarged view of the grinder illustrated in FIG. 18.

On the other hand, as illustrated in FIG. 21, in the state that the side handle is attached to the attachment portion, the first intermediate member 460 is displaced and is brought into a state of not blocking the displacement route for displacing the second intermediate member 480 forward from the first corresponding position (the first intermediate member 460 is displaced to a not-illustrated position in the cross section illustrated in FIG. 21) similarly to the first embodiment. In other words, the above-described abutment between members does not occur, and the forward displacements of the operation member 450 and the second intermediate member 480 are permitted. Therefore, the user can displace the operation member 450 and the second intermediate member 480 forward to the position illustrated in FIGS. 18 and 21 against the biasing force of the coil spring 485. At this time, as illustrated in FIG. 18, the engagement portion 452 of the operation member 450 is supported on the support portion 446 of the lock-off portion 443 but the engagement portion 445 is absent right above the engagement portion 452. Therefore, the operation member 450 is in an upward displaceable state (i.e., the lock-off released state). The position of the operation member 50 at this time will be referred to as a lock-off released position, and the position of the second intermediate member 480 at this time will be referred to as a second corresponding position.

Figure 19:
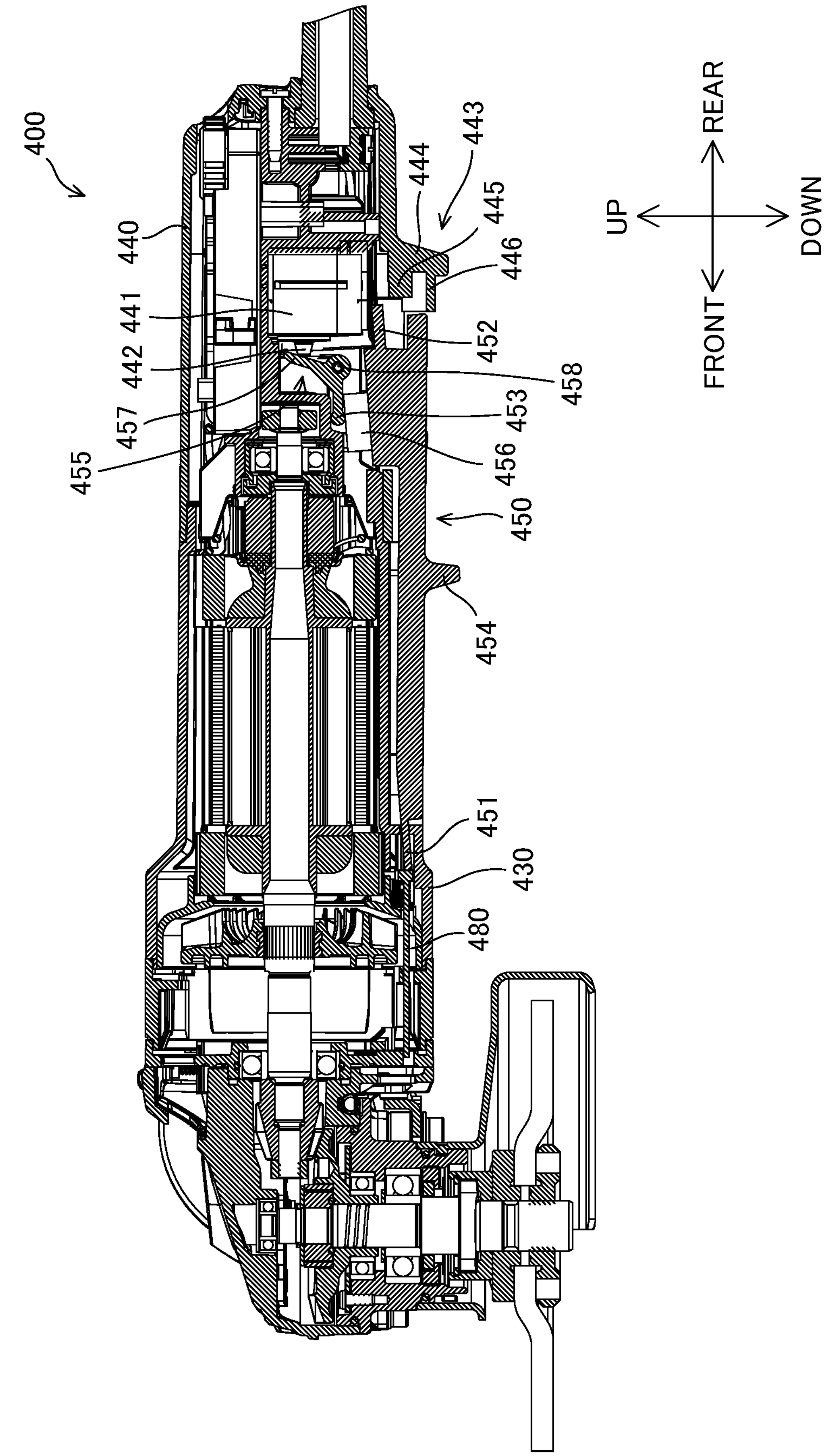
FIG. 19 is a vertical cross-sectional view of the grinder according to the second embodiment, and illustrates a state that the side grip is attached thereto and the operation member is located at the lock-off released position and an ON position

When the user displaces the operation member 450 upward after the operation member 450 is brought into the lock-off released state at the OFF position in this manner, the switch 441 is switched to the ON state via the pivotal member 455 in the above-described manner as illustrated in FIG. 19. On the other hand, when stopping the driving of the grinder 400, the user releases the operation of displacing the operation member 450 upward, according to which the operation member 450 is returned from the ON position (refer to FIG. 19) to the OFF position (refer to FIG. 18) as described above. At this time, the operation member 450 is returned from the lock-off released position (refer to FIG. 18) to the lock-off position (refer to FIG. 17) under the biasing force of the coil spring 485, and the second intermediate member 480 is returned from the second corresponding position to the first corresponding position.

According to the above-described grinder 400, the configuration that allows the electric motor to be driven only when the side handle is attached can be realized using only a mechanical structure without using a sensor. Further, the displacement of the operation member 450 accompanying the above-described operation of releasing the lock-off is easily recognizable to the user. Therefore, when the electric motor cannot be driven despite the fact that the user performs the operation of displacing the operation member 450 from the OFF position to the ON position, the user can easily notice that the reason therefor is not a failure in the switch 441 but because the operation of the releasing the lock-off cannot be performed due to no attachment of the side handle.

Further, according to the grinder 400, the second intermediate member 480, which is moved in conjunction with the operation member 450, is disposed between the first intermediate member 460 and the operation member 450. This allows the grinder 400 to have even such a layout that the first intermediate member 460 and the operation member 450 are separated, thereby improving the design flexibility of the grinder 400. However, the second intermediate member 480 may be omitted. In this case, the actuation end portion 451 of the operation member 450 may extend to the position of the first intermediate member 460 in the front-rear direction, and the first intermediate member 460 may block the displacement route of the actuation end portion 451 only when the side handle is not attached.

In an alternative embodiment, the grinder 400 may be configured to allow the operation member 450 to be switched from the lock-off state to the lock-off released state only when both the side handle and the cover are attached, similarly to the first embodiment. Alternatively, the grinder 400 may be configured to allow the operation member 450 to be switched from the lock-off state to the lock-off released state only when the cover is attached.

In a further alternative embodiment, a displaceably configured lock-off member may be provided as a lock-off portion instead of the lock-off portion 443 having the fixed engagement structure. In this case, a second intermediate member that prohibits the lock-off member from being displaced from the lock-off position to the lock-off released position only when the side handle is not attached may be provided between the first intermediate member 460 and the lock-off member.

Having described the embodiments of the present invention, the above-described embodiments are intended to only facilitate the understanding of the present invention, and are not intended to limit the present invention thereto. The present invention can be modified or improved without departing from the spirit thereof, and includes equivalents thereof. Further, each of the elements described in the claims and the specification can be combined in any manner or omitted in any manner within a range that allows it to remain capable of achieving at least a part of the above-described objects or bringing about at least a part of the above-described advantageous effects.

For example, the shapes and the forms of the components of the above-described grinder 10 are merely examples, and can be changed in any manner as long as the functions of these components can be maintained. For example, the pressed portions 62*a* to 62*c* of the first intermediate member 60 may protrude forward or rearward instead of protruding radially outward. Alternatively, the blocking portion 64 may be omitted, and be replaced with a through-hole formed on the first intermediate member main body 61 in such a manner that the third intermediate member 80 can penetrate therethrough when the first intermediate member 60 is located at the first non-blocking position. This case means the first intermediate member main body 61 fulfills the function of blocking the displacement route of the third intermediate member 80 when the first intermediate member 60 is located at the first non-blocking position. Alternatively, at least a part of the third intermediate member 80 (for example, the horizontally extending portion 82) may be a wire.

Further, the first intermediate member 60 may be indirectly pressed by the side handle 200 when the side handle 200 is attached. More specifically, an additional member that is displaced by being pressed by the side handle 200 may be provided, and the first intermediate member 60 may be displaced by this additional member. Similarly, the second intermediate member 70 may be indirectly pressed by the cover 300 when the cover 300 is attached.

Further, the first intermediate member 60 may be configured to be tilted by being pressed by the side handle 200 when the side handle 200 is attached instead of being configured to be rotated when the side handle 200 is attached. For example, the first intermediate member 60 may include a support shaft on the upper side of the first intermediate member 60 and be tilted about this support shaft in such a manner that the lower edge of the first intermediate member 60 approaches the front side when the side handle 200 is attached.

Further, the above-described embodiments can be applied to not only the grinder 10 but also any tool including a prime mover and configured to allow two types of accessories to be detachably attached thereto.

DESCRIPTION OF NUMERALS

10, 400 grinder
20 gear housing
22 second attachment portion
23 small bevel gear
24 large bevel gear
25 spindle
26 inner flange
27 lock nut
28 tool accessory
29*a*, 29*b*, 29*c* first attachment portion
30, 430 motor housing
31 electric motor
32 motor shaft
40, 440 handle housing
41, 441 switch
42, 442 input member
50, 450 operation member
51 support shaft
52 protrusion
53 spring seat
54 spring
55 actuation end portion
57 lock-off switch
60 first intermediate member
61 first intermediate member main body
62*a*, 62*b*, 62*c* pressed portion
63*a*, 63*b*, 63*c* pressed surface
64 blocking portion
65 first though-hole
67 protrusion
68 spring
70 second intermediate member
71 base
72 pressed portion
73 blocking portion
74 support portion
76 second through-hole
78 spring seat
79 spring

80 third intermediate member
81 vertically extending portion
82 horizontally extending portion
83 front end
91, 92 bolt
100 conversion mechanism
110 first link member
111 pressing portion
112, 113 engagement portion
112*a*, 113*a* groove
114 through-hole
120 second link member
121 vertically extending portion
122 first horizontally extending portion
123 second horizontally extending portion
124 support shaft
130 holding member
131 spring seat
132 spring
133 through-hole
134, 135 opening
140 holding member
141 annular portion
142 hollow circular cylindrical portion
143, 144, 145, 146 protrusion portion
143*a*, 144*a*, 145*a*, 146*a* screw hole
147 cutout
148 spring seat
149 spring housing portion
200 side handle
210 grip portion
220 attachment portion
300 cover
310 cover main body
320 attachment portion
431 through-hole
432 baffle plate
443 lock-off portion
444 base portion
445 engagement portion
446 support portion
451 actuation end portion
452 engagement portion
453, 454 protrusion
455 pivotal member
456 first portion
457 second portion
458 pin
460 first intermediate member
480 second intermediate member
481 increased diameter portion
482 distal end
485 coil spring
AX1, AX2 rotational axis

The invention claimed is:

1. A tool comprising:

a prime mover;

a switch for driving the prime mover;

an operation member configured to be displaceable between an OFF position of bringing the switch into an OFF state and an ON position of bringing the switch into an ON state;

a first accessory;

a second accessory;

a first attachment portion configured to allow the first accessory to be detachably attached thereto;

a second attachment portion configured to allow the second accessory to be detachably attached thereto;

a first intermediate member configured to be displaced by the attachment of the first accessory to the first attachment portion;

a second intermediate member configured to be displaced by the attachment of the second accessory to the second attachment portion; and a third intermediate member configured to be displaced along a displacement route between an OFF corresponding position corresponding to the OFF position and an ON corresponding position corresponding to the ON position in conjunction with the displacement of the operation member, wherein the first intermediate member is located at a first blocking position of blocking the displacement route of the third intermediate member in a state that the first accessory is not attached to the first attachment portion, and is located at a first non-blocking position of not blocking the displacement route of the third intermediate member in a state that the first accessory is attached to the first attachment portion, the second intermediate member is located at a second blocking position of blocking the displacement route of the third intermediate member in a state that the second accessory is not attached to the second attachment portion, and is located at a second non-blocking position of not blocking the displacement route of the third intermediate member in a state that the second accessory is attached to the second attachment portion, when the first intermediate member is located at the first non-blocking position and the second intermediate member is located at the second non-blocking position, the third intermediate member is permitted to be displaced from the OFF corresponding position to the ON corresponding position so that the operation member is permitted to be displaced from the OFF position to the ON position, when at least the first intermediate member is located at the first blocking position or at least the second intermediate member is located at the second blocking position, the third intermediate member is prohibited from being displaced from the OFF corresponding position to the ON corresponding position by at least one of the first intermediate member in the first blocking position or the second intermediate member in the second blocking position so that the operation member is prohibited from being displaced from the OFF position to the ON position, the prime mover is an electric motor, the tool is a grinder including a tool accessory configured to be rotated by the electric motor, the first accessory is a side grip, the second accessory is a cover that partially covers the tool accessory, the second intermediate member is configured to be linearly moved by being directly or indirectly pressed by the cover when the cover is attached to the second attachment portion, the second intermediate member includes a second through-hole in the form of an elongated hole having a longitudinal direction extending along a direction in which the second intermediate member is linearly moved, and the second intermediate member is attached linearly movably along the elongated hole using a screw via the second through-hole.

2. The tool according to claim 1, wherein the first attachment portion includes at least two side grip attachment portions for selectively attaching the side grip, the first intermediate member is a single member provided in common for the at least two side grip attachment portions, and the first intermediate member includes at least one pressed portion configured to, when the side grip is attached to one side grip attachment portion arbitrarily selected from the at least two side grip attachment portions, be directly or indirectly pressed by the side grip, and the first intermediate member is configured to be displaced when the at least one pressed portion is pressed.

3. A tool comprising:

a prime mover;

a switch for driving the prime mover;

an operation member configured to be displaceable between an OFF position of bringing the switch into an OFF state and an ON position of bringing the switch into an ON state;

a first accessory;

a second accessory;

a first attachment portion configured to allow the first accessory to be detachably attached thereto;

a second attachment portion configured to allow the second accessory to be detachably attached thereto;

a first intermediate member configured to be displaced by the attachment of the first accessory to the first attachment portion;

a second intermediate member configured to be displaced by the attachment of the second accessory to the second attachment portion; and a third intermediate member configured to be displaced along a displacement route between an OFF corresponding position corresponding to the OFF position and an ON corresponding position corresponding to the ON position in conjunction with the displacement of the operation member, wherein the first intermediate member is located at a first blocking position of blocking the displacement route of the third intermediate member in a state that the first accessory is not attached to the first attachment portion, and is located at a first non-blocking position of not blocking the displacement route of the third intermediate member in a state that the first accessory is attached to the first attachment portion, the second intermediate member is located at a second blocking position of blocking the displacement route of the third intermediate member in a state that the second accessory is not attached to the second attachment portion, and is located at a second non-blocking position of not blocking the displacement route of the third intermediate member in a state that the second accessory is attached to the second attachment portion, when the first intermediate member is located at the first non-blocking position and the second intermediate member is located at the second non-blocking position, the third intermediate member is permitted to be displaced from the OFF corresponding position to the ON corresponding position so that the operation member is permitted to be displaced from the OFF position to the ON position, when at least the first intermediate member is located at the first blocking position or at least the second intermediate member is located at the second blocking position, the third intermediate member is prohibited from being displaced from the OFF corresponding position to the ON corresponding position by at least one of the first intermediate member in the first blocking position or the second intermediate member in the second blocking position so that the operation member is prohibited from being displaced from the OFF position to the ON position, the prime mover is an electric motor, the tool is a grinder including a tool accessory configured to be rotated by the electric motor, the first accessory is a side grip, and the second accessory is a cover that partially covers the tool accessory, the first attachment portion includes at least two side grip attachment portions for selectively attaching the side grip, the first intermediate member is a single member provided in common for the at least two side grip attachment portions, and the first intermediate member includes at least one pressed portion configured to, when the side grip is attached to one side grip attachment portion arbitrarily selected from the at least two side grip attachment portions, be directly or indirectly pressed by the side grip, and the first intermediate member is configured to be displaced when the at least one pressed portion is pressed.

4. The tool according to claim 3, wherein the first intermediate member includes a first intermediate member main body having an annular shape or a partially annular shape, and the at least two side grip attachment portions are located at positions spaced apart from each other in a circumferential direction of the annular shape or the partially annular shape, respectively.

5. The tool according to claim 4, wherein the first intermediate member is configured to be rotated about a rotational axis when the at least one pressed portion is pressed.

6. The tool according to claim 5, wherein the at least one pressed portion protrudes radially outward from the first intermediate member main body, and the at least one pressed portion is provided at at least two positions respectively corresponding to positions of the at least two side grip attachment portions, respectively.

7. The tool according to claim 6, wherein the first intermediate member includes a blocking portion that blocks the displacement route of the third intermediate member when the first intermediate member is located at the first blocking position, and the blocking portion protrudes radially outward from the first intermediate member main body.

8. The tool according to claim 5, wherein the first intermediate member main body includes a first through-hole having a circular-arc shape centered at the rotational axis, and the first intermediate member is attached rotatably along the circular-arc shape using a screw via the first through-hole.

9. The tool according to claim 3, wherein the at least one pressed portion includes a pressed surface angled with respect to a longitudinal direction of the side grip in such a manner that the first intermediate member is displaced in a direction different from the longitudinal direction of the side grip, the longitudinal direction of the side grip being a longitudinal direction of the side grip when the side grip is attached to the one side grip attachment portion.

10. The tool according to claim 3, wherein the second intermediate member is configured to be linearly moved by being directly or indirectly pressed by the cover when the cover is attached to the second attachment portion.

11. The tool according to claim 10, wherein the second intermediate member includes a second through-hole in the form of an elongated hole having a longitudinal direction extending along a direction in which the second intermediate member is linearly moved, and the second intermediate member is attached linearly movably along the elongated hole using a screw via the second through-hole.

12. The tool according to claim 3, wherein a rotational axis of the electric motor and a rotational axis of the tool accessory intersect with each other.

13. The tool according to claim 3, wherein the first attachment portion and the second attachment portion are disposed on a first side in a longitudinal direction of the tool, the operation member is disposed on a second side opposite from the first side, and the third intermediate member is an elongate member extending in the longitudinal direction.

14. The tool according to claim 3, further comprising a single holding member that holds the first intermediate member and the second intermediate member.

15. The tool according to claim 3, wherein a first displacement direction, which is a displacement direction of the operation member, and a second displacement direction, which is a displacement direction of the third intermediate member, are different from each other, and the tool includes a conversion mechanism configured to convert a motion of the operation member in the first displacement direction into a motion of the third intermediate member in the second displacement direction.

16. The tool according to claim 3, further comprising:

a handle housing configured to be held by a user; and a motor housing containing the electric motor therein, wherein the handle housing is located on an opposite side of the motor housing from the tool accessory in a direction in which a rotational axis of the electric motor extends.

17. The tool according to claim 5, wherein the at least one pressed portion includes a pressed surface angled with respect to a longitudinal direction of the side grip in such a manner that the first intermediate member is displaced in a direction different from the longitudinal direction of the side grip, the longitudinal direction of the side grip being a longitudinal direction of the side grip when the side grip is attached to the one side grip attachment portion.

18. The tool according to claim 5, wherein the second intermediate member is configured to be linearly moved by being directly or indirectly pressed by the cover when the cover is attached to the second attachment portion.

19. The tool according to claim 5, wherein the second intermediate member is configured to be linearly moved by being directly or indirectly pressed by the cover when the cover is attached to the second attachment portion, the first attachment portion and the second attachment portion are disposed on a first side in a longitudinal direction of the tool, the operation member is disposed on a second side opposite from the first side, and the third intermediate member is an elongate member extending in the longitudinal direction.

20. The tool according to claim 5, wherein the second intermediate member is configured to be linearly moved by being directly or indirectly pressed by the cover when the cover is attached to the second attachment portion, and the tool further comprises a single holding member that holds the first intermediate member and the second intermediate member.

21. A tool comprising:

a prime mover;

a switch for driving the prime mover;

an operation member configured to be displaceable between an OFF position of bringing the switch into an OFF state and an ON position of bringing the switch into an ON state;

a first accessory;

a second accessory;

a first attachment portion configured to allow the first accessory to be detachably attached thereto;

a second attachment portion configured to allow the second accessory to be detachably attached thereto;

a first intermediate member configured to be displaced by the attachment of the first accessory to the first attachment portion;

a second intermediate member configured to be displaced by the attachment of the second accessory to the second attachment portion;

a third intermediate member configured to be displaced along a displacement route between an OFF corresponding position corresponding to the OFF position and an ON corresponding position corresponding to the ON position in conjunction with the displacement of the operation member; and a single holding member that holds the first intermediate member and the second intermediate member, wherein the first intermediate member is located at a first blocking position of blocking the displacement route of the third intermediate member in a state that the first accessory is not attached to the first attachment portion, and is located at a first non-blocking position of not blocking the displacement route of the third intermediate member in a state that the first accessory is attached to the first attachment portion, the second intermediate member is located at a second blocking position of blocking the displacement route of the third intermediate member in a state that the second accessory is not attached to the second attachment portion, and is located at a second non-blocking position of not blocking the displacement route of the third intermediate member in a state that the second accessory is attached to the second attachment portion, when the first intermediate member is located at the first non-blocking position and the second intermediate member is located at the second non-blocking position, the third intermediate member is permitted to be displaced from the OFF corresponding position to the ON corresponding position so that the operation member is permitted to be displaced from the OFF position to the ON position, and when at least the first intermediate member is located at the first blocking position or at least the second intermediate member is located at the second blocking position, the third intermediate member is prohibited from being displaced from the OFF corresponding position to the ON corresponding position by at least one of the first intermediate member in the first blocking position or the second intermediate member in the second blocking position so that the operation member is prohibited from being displaced from the OFF position to the ON position.

* * * * *